(12) United States Patent
Nakazawa et al.

(10) Patent No.: US 7,324,096 B2
(45) Date of Patent: Jan. 29, 2008

(54) TOUCH PANEL DEVICE

(75) Inventors: Fumihiko Nakazawa, Kawasaki (JP); Satoshi Sano, Kawasaki (JP); Yoshio Satoh, Kawasaki (JP); Takashi Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 693 days.

(21) Appl. No.: 10/277,963

(22) Filed: Oct. 23, 2002

(65) Prior Publication Data

US 2003/0038789 A1    Feb. 27, 2003

Related U.S. Application Data

(63) Continuation of application No. PCT/JP00/03284, filed on May 22, 2000.

(51) Int. Cl.
| | |
|---|---|
| *G06F 3/041* | (2006.01) |
| *G06F 3/043* | (2006.01) |
| *H01L 27/20* | (2006.01) |
| *H01L 41/00* | (2006.01) |
| *H02N 2/00* | (2006.01) |

(52) U.S. Cl. .................. 345/177; 257/254; 310/313 R; 310/313 A; 310/313 B; 310/313 C; 345/173

(58) Field of Classification Search ............ 310/313 A; 345/173, 177

See application file for complete search history.

(56) References Cited

U.S. PATENT DOCUMENTS

| | | | | |
|---|---|---|---|---|
| 4,775,961 A | * | 10/1988 | Capek et al. ................ 367/140 |
| 5,638,093 A | * | 6/1997 | Takahashi et al. .......... 345/173 |
| 5,717,434 A | * | 2/1998 | Toda .......................... 345/177 |
| 5,838,088 A | * | 11/1998 | Toda ...................... 310/313 R |

FOREIGN PATENT DOCUMENTS

DE    39 19 463 A1    12/1989

(Continued)

OTHER PUBLICATIONS

Japanese Office Action dated Nov. 28, 2005, corresponding to Japanese Patent Application No. 2001-587199.

(Continued)

*Primary Examiner*—Sumati Lefkowitz
*Assistant Examiner*—Alexander S. Beck
(74) *Attorney, Agent, or Firm*—Westerman, Hattori, Daniels & Adrian, LLP.

(57) ABSTRACT

A plurality of excitation elements, each including an IDT and a piezoelectric film, for exciting, respectively, surface acoustic waves, each having a unique center frequency, are formed on one end of a non-piezoelectric substrate, a plurality of receiving elements, each including an IDT and a piezoelectric film, for receiving, respectively, surface acoustic waves, each having a unique center frequency, are formed on the other end of the non-piezoelectric substrate to face the excitation elements, respectively, the center frequencies of the IDTs of the facing excitation element and receiving element are equal, the center frequencies of the IDTs of the excitation elements next to each other are different, and surface acoustic waves are propagated across the non-piezoelectric substrate, between the facing excitation elements and receiving elements so as to detect the position of an object in contact with the non-piezoelectric substrate, based on received results in the receiving elements.

6 Claims, 33 Drawing Sheets

FOREIGN PATENT DOCUMENTS

| | | |
|---|---|---|
| JP | 55-108033 | 8/1980 |
| JP | 6-43995 | 2/1994 |
| JP | 6-75688 | 3/1994 |
| JP | 6-75689 | 3/1994 |
| JP | 6-149458 | 5/1994 |
| JP | 6-161643 | 6/1994 |
| JP | 06-348396 | 12/1994 |

OTHER PUBLICATIONS

German Office Action DE 100 66 337.0-53 dated Aug. 18, 2006.
German Office Action DE 100 85 466.4-53 dated Aug. 18, 2006.

* cited by examiner

FIG. 2
(a) 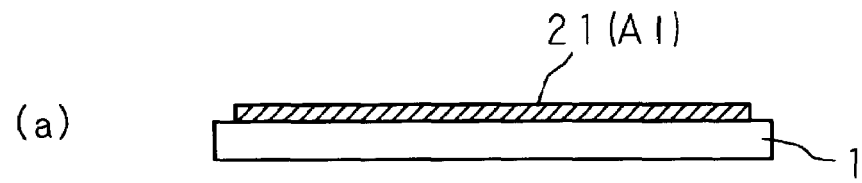
(b) 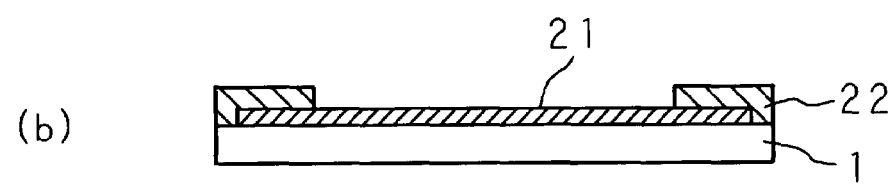
(c) 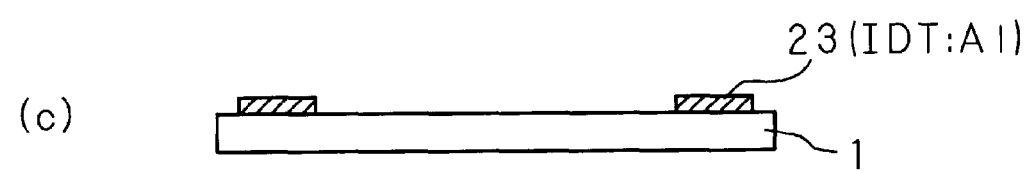
(d) 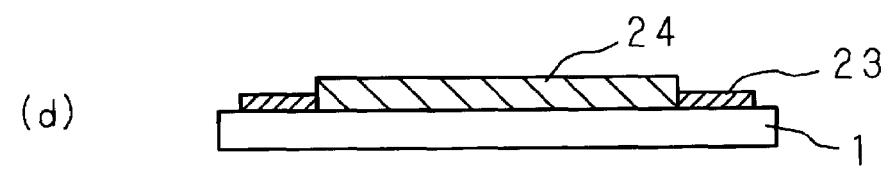
(e) 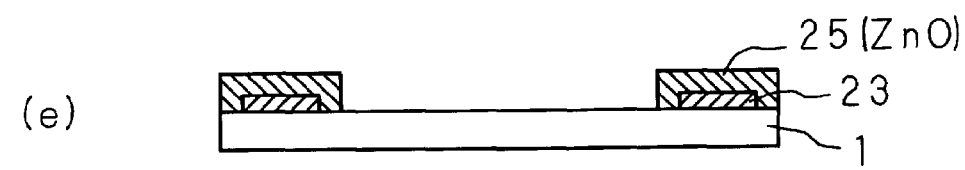

FIG. 9
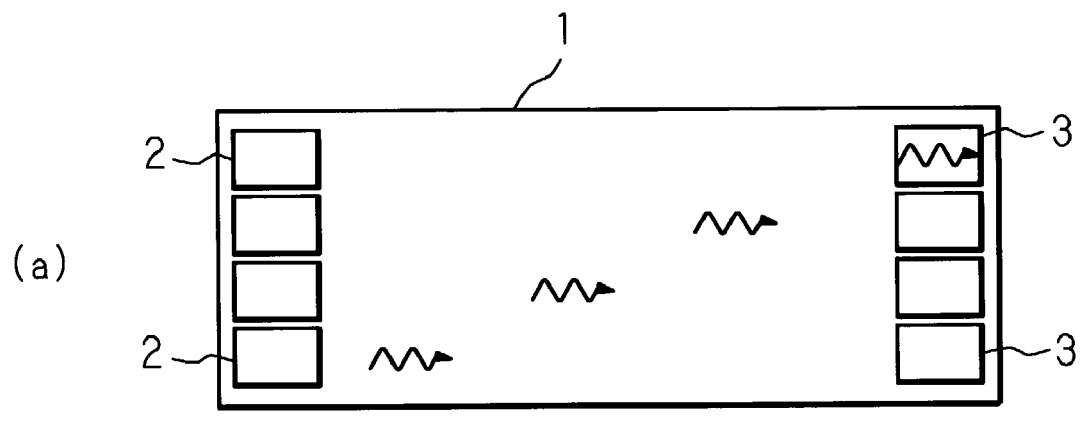
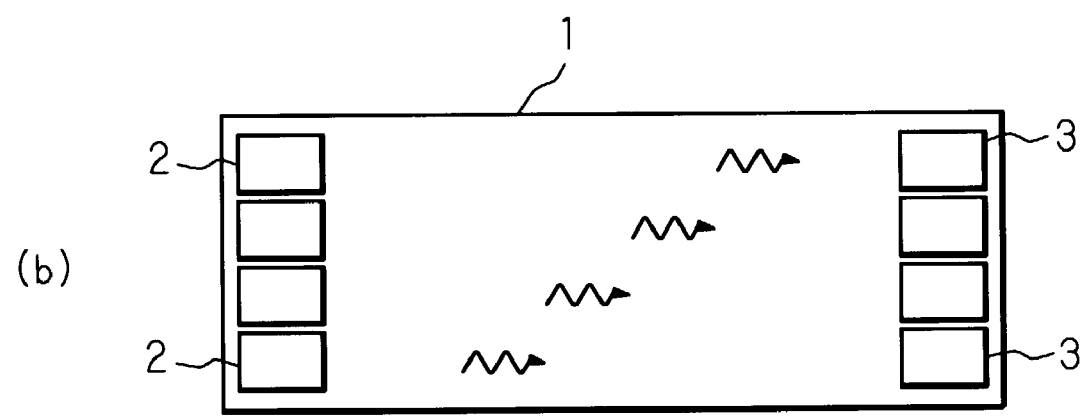

FIG. 15
(a)
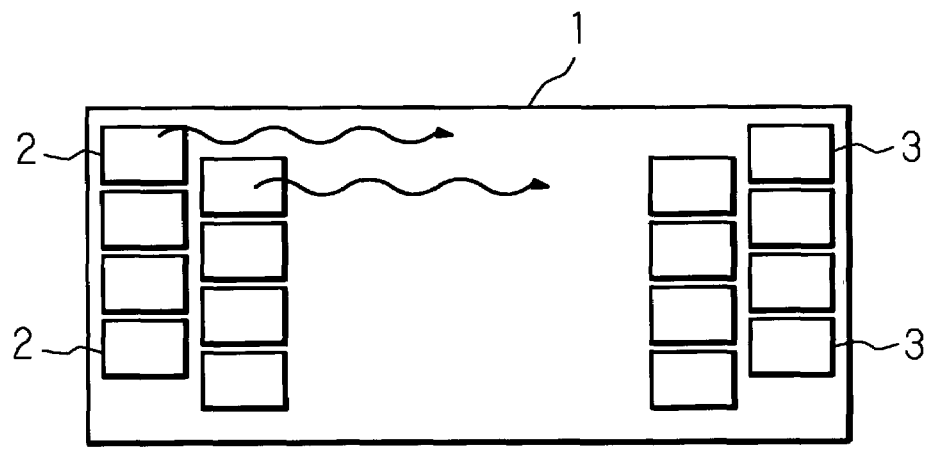
(b)
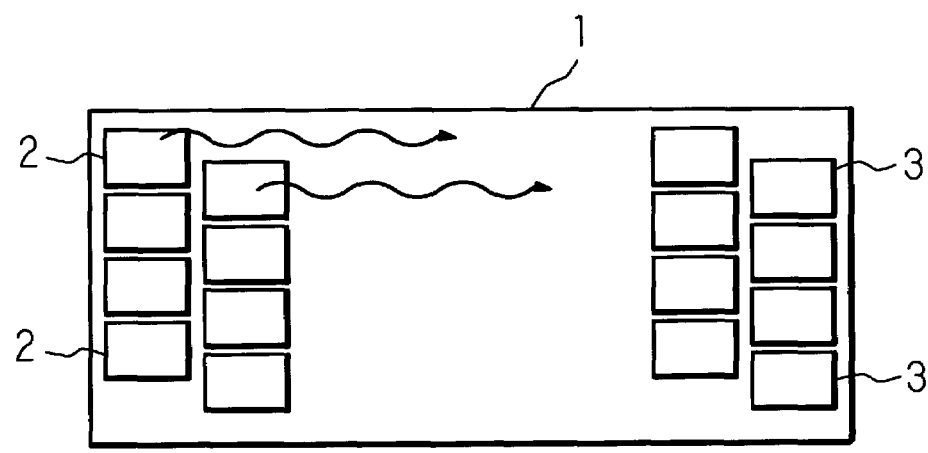
(c)
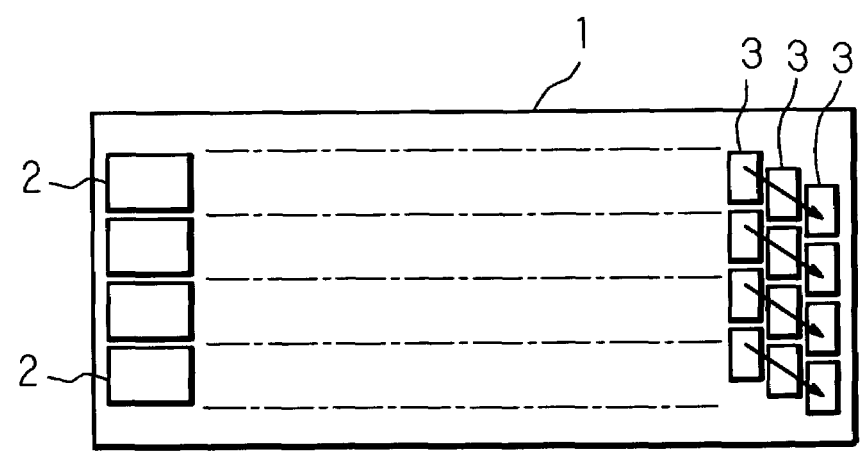

TOUCH PANEL DEVICE

This application is a continuation of international application PCT/JP00/03284 filed May 22, 2000.

TECHNICAL FIELD

The present invention relates to a touch panel device for detecting contact of a finger or an object with the touch panel device, and more specifically relates to a touch panel device using IDTs for detecting the contact by detecting blockage of surface acoustic waves.

BACKGROUND ART

With the spread of computer systems, mainly personal computers, there has been used a device for inputting new information or giving various instructions to a computer system by pointing at a position on a display screen of a display device on which information is displayed by the computer system, with a finger or an object. In order to perform an input operation with respect to the information displayed on the display screen of the display device of a personal computer or the like by a touching method, it is necessary to detect the contact position (indicated position) on the display screen with high accuracy.

As the touch panel devices for detecting the contact position of a finger or an object, a device using a resistance film and a device using ultrasonic waves have been well known. The former device using a resistance film detects a change in the resistance of the resistance film caused by the contact of the finger or the object with the resistance film. This device has the advantage of low power consumption, but has problems in the response time, detection performance and durability.

The latter device using ultrasonic waves propagates surface acoustic waves (SAWs) across a non-piezoelectric substrate and detects attenuation of the surface acoustic waves which is caused by contact of a finger or an object with the non-piezoelectric substrate. There has been proposed a touch panel device using an element composed of an IDT (Inter Digital Transducer) and a piezoelectric thin film as an excitation element for exciting a surface acoustic wave and a receiving element for receiving the propagated surface acoustic wave.

In this touch panel device, a plurality of excitation elements, each composed of the IDT and the piezoelectric thin film, are disposed on one end of the non-piezoelectric substrate and a plurality of receiving elements, each composed of the IDT and the piezoelectric thin film, are disposed on the other end of the non-piezoelectric substrate to face the excitation elements, respectively. An electric signal is inputted to each excitation element to excite a surface acoustic wave and propagate the surface acoustic wave across the non-piezoelectric substrate, and the propagated surface acoustic wave is received by the receiving element. Then, when a finger or an object comes into contact with the propagation paths of surface acoustic waves on the non-piezoelectric substrate, the surface acoustic waves attenuate. Accordingly, by detecting whether or not there is attenuation in the level of the received signals of the receiving elements, it is possible to detect whether or not contact was made.

In a conventional touch device, the IDTs of all the excitation elements and receiving elements have the same center frequency, and therefore contact of a finger or an object with the propagation path between a receiving element and the facing excitation element is detected by switching the IDTs to be connected to excitation/receiving circuits and detecting which receiving element's received signal attenuated.

In order to improve the detection accuracy, it may be considered to decrease the installation pitch of these excitation elements and receiving elements. However, decreasing the installation pitch increases the possibility that the surface acoustic wave from an excitation element is received by the next receiving element which does not face this excitation element. In this case, in the conventional touch panel device, since every pair of the facing excitation element and receiving element has the same center frequency, the receiving element receives a surface acoustic wave from the next excitation element as it is and can not distinguish it from a surface acoustic wave from the proper excitation element facing this receiving element. Thus, there is a problem of causing detection errors.

The present invention has been made with the aim of solving the above problems, and it is an object of the present invention to provide a touch panel device capable of detecting contact of a finger or an object with the touch panel device with high accuracy and detecting the accurate contact position.

Another object of the present invention is to provide a touch panel device capable of eliminating a delay in the detection process caused by a delay in the propagation of surface acoustic waves.

Still another object of the present invention is to provide a small-sized touch panel device having high detection accuracy.

Yet another object of the present invention is to provide a touch panel device capable of detecting the two-dimensional contact position with a simple circuit structure.

DISCLOSURE OF THE INVENTION

The IDT itself possesses bandpass filter characteristics, and excites/receives only a surface acoustic wave having a pass-band frequency specified by a predetermined center frequency with respect to the input frequency and a predetermine bandwidth. In the present invention, a plurality of excitation elements, each composed on an IDT and a piezoelectric film, are arranged on one end of a non-piezoelectric substrate and a plurality of receiving elements, each composed of an IDT and a piezoelectric film, are arranged on the other end of the non-piezoelectric substrate to face the excitation elements, the center frequencies of the IDTs of the facing excitation element and receiving element are equal, and the IDTs of the excitation elements next to each other and the IDTs of the receiving elements next to each other are respectively designed to have different center frequencies.

Accordingly, since the center frequencies of the elements placed next to each other are different, a receiving element can selectively receive only a surface acoustic wave from the facing excitation element without receiving a surface acoustic wave from any excitation element that does not face the receiving element, and therefore, even when the installation pitch of the excitation elements and of the receiving elements is narrowed, the detection accuracy does not deteriorate and accurate detection results can be obtained.

In the touch panel device as described above, the time of the input signal to the excitation element is changed to intermittent burst. Since the propagation velocity of the surface acoustic wave is slow as compared to that of an electric signal, a delay is caused. Therefore, if, after completing the surface acoustic wave excitation/receiving processes for a pair of excitation element and receiving element, the same processes are performed for the next pair of excitation element and receiving element, then it takes a long time to complete the entire processes and the contact position can not be detected quickly. Hence, in the present invention, without waiting for receipt of a surface acoustic wave in one pair, excitation of a surface acoustic wave in the next pair is started. Accordingly, it is possible to eliminate a detection delay caused by the above-mentioned delay, and quickly detect the contact position.

Moreover, in the above-mentioned intermittent burst change, the duration in which the input signal to the excitation element is continued is about equal to the time necessary for the receiving process, more specifically the time obtained by dividing the length of the IDT of the receiving element by the velocity of the surface acoustic wave across the substrate. Further, the duration in which the input signal to the excitation element is stopped is not longer than the time obtained by dividing the distance between the IDTs of the excitation element and receiving element by the velocity of the surface acoustic wave across the substrate. It is therefore possible to perform the excitation/receiving processes efficiently and reduce the power consumption.

Besides, it is designed that, when the above-mentioned intermittent burst change is started, the received signal in the receiving element is not detected for a predetermined period, more specifically the time obtained by dividing the distance between the IDTs of the excitation element and receiving element by the velocity of the surface acoustic wave across the substrate. Accordingly, it is possible to prevent detection errors due to the influence of noise.

In order to improve the detection accuracy of the touch panel device, it may be considered to decrease the apertures of the excitation elements and increase the installation density thereof. With this arrangement, however, the distance between the excitation elements next to each other is narrower, and there arises a problem concerning the influence of diffraction. The influence of diffraction can be eliminated by exciting a surface acoustic wave having a high frequency with each excitation element. In this case, however, the loss in the electric signal line and the propagation of the surface acoustic waves increases, and it is difficult to send and receive the signals. It is therefore not advantageous to simply increase the frequency of the surface acoustic waves.

Hence, the present invention arranges one or a plurality of receiving elements to form pairs with a plurality of excitation elements. As a technique for implementing this arrangement, selected is a technique in which the center frequency of the IDT of a receiving element facing an excitation element is shifted by a predetermined amount within the bandwidth (for example, a half of the bandwidth) from the center frequency of the IDT of the excitation element; or a technique in which the apertures of the facing excitation element and receiving element are shifted from each other by a half of the installation pitch. Accordingly, it is possible to obtain not only the received results corresponding to the center frequencies of the IDTs of the excitation elements, but also interpolative received results between them, thereby improving the detection accuracy without particularly increasing the size of the device structure.

Moreover, in the present invention, the center frequencies of the IDTs of the excitation elements/receiving elements are monotonously increased or monotonously decreased in the order they are arranged, and the number of electrodes in each of the IDTs is varied so that the length of each IDT is not more than a certain length. Accordingly, a region where the excitation elements/receiving elements are formed will not be larger than a certain area, thereby limiting the formation region of the excitation elements/receiving elements within the certain area and achieving a reduction in the size of the device.

In the present invention, by orthogonally arranging two sets of a plurality of pairs of the mutually facing excitation elements and receiving elements so that propagation directions of the surface acoustic waves become orthogonal to each other, it is possible to detect the two-dimensional contact position of a finger or an object. In this case, each set of the excitation elements and receiving elements may be driven/controlled independently. Further, the excitation processes to be performed in both sets of a plurality of excitation elements and/or the receiving processes to be performed in both sets of a plurality of receiving elements may be carried out by a common operation. In this case, it is possible to simplify the circuit.

As a technique for determining the contact position of a finger or a pen based on the levels of the received signals in the receiving elements, there may be a technique in which the center position of a plurality of propagation paths where attenuation of the received signals was seen is determined as the contact position; a technique in which a propagation path where the largest attenuation of the received signal was seen is determined as the contact position; and a technique in which the center of gravity obtained based on the amount of attenuation of the received signal in each of the propagation paths is determined as the contact position. In addition, by obtaining a movement direction vector starting at the center of the contact range and ending at the center of gravity, it is possible to estimate the direction of the movement of the finger or object.

In another touch panel device of the present invention, the contact position is detected based on the difference in the propagation time caused by the propagation delays of the surface acoustic waves. In a plurality of pairs of the facing excitation elements and receiving elements, the distance between the excitation element and receiving element varies according to each pair. For one-dimensional detection, the center frequencies of the IDTs of the respective excitation elements are made equal to each other. If the excitation elements are excited simultaneously, the distances from the respective excitation elements to the facing receiving elements differ, and therefore it is possible to specify each propagation path from the time-series received signals in the receiving elements. Consequently, it is possible to detect the contact position of the finger or object with such a technique.

In order to realize such a difference in the distance, the IDTs of the excitation elements and/or the IDTs of the receiving elements are arranged in a step-like pattern. In this case, the step-like difference between the IDTs placed next to each other is equal to the length of the IDT or about a half of the length of the IDT. Or, surface acoustic waves from the excitation elements are received by a single common receiving element (or surface acoustic waves are excited by a single common excitation element) by arranging the IDTs of the excitation elements (or the receiving elements) in a step-like pattern and designing the aperture length of the IDT of the receiving element (or the excitation element) to be approximately equal to the length of the whole step-like IDTs. Alternatively, the IDTs are arranged in a step-like pattern on one end of the substrate and a reflecting member is provided on the other end, so that a surface acoustic wave is excited and received by the same element (IDT) by using the reflection of the surface acoustic wave from the reflecting member.

In the case where the contact position is detected based on the difference in the propagation time of the surface acoustic waves, in order to enhance the difference in the propagation time, it is preferred that the excitation elements and receiving elements are arranged to propagate the surface acoustic waves in diagonal directions of the substrate.

BRIEF DESCRIPTION OF THE DRAWINGS

FIG. 2 is a cross sectional view showing the process of producing an excitation element and a receiving element;

FIGS. 9(a) and 9(b) are schematic views showing the propagating state of surface acoustic waves in the third embodiment;

FIGS. 15(a), 15(b) and 15(c) are schematic views showing the arrangement of the excitation elements/receiving elements and the propagating state of the surface acoustic waves in the seventh embodiment;

THE BEST MODE FOR CARRYING OUT THE INVENTION

The following description will explain the present invention in detail with reference to the drawings illustrating some embodiments thereof.

First Embodiment

Figure 1:
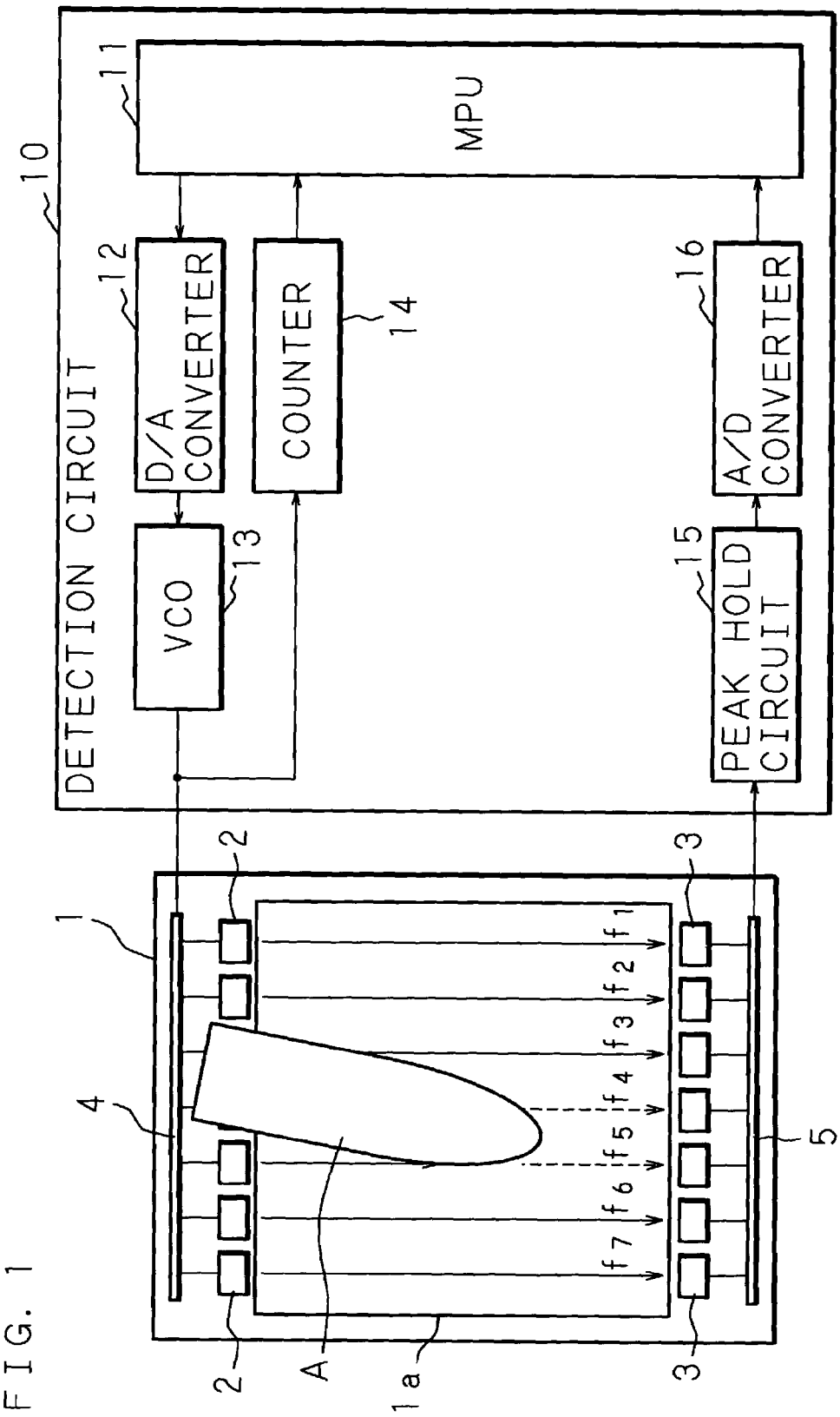
FIG. 1 is a schematic view showing the basic structure of a touch panel device of the present invention.

FIG. 1 is a schematic view showing the basic structure of a touch panel device of the present invention. In FIG. 1, 1 is a rectangular non-piezoelectric substrate made of a glass substrate, for example. On one end of the substrate 1, a plurality of (more specifically, seven) excitation elements 2 for exiting surface acoustic waves are formed in a line. Besides, on the other end of the substrate 1, a plurality of (more specifically, seven) receiving elements 3 for receiving surface acoustic waves are formed in a line so as to face the excitation elements 2, respectively.

The excitation elements 2 and the receiving elements 3 have the same configuration, and they are formed through the process as described later by layering an IDT and a piezoelectric thin film. The IDT has two mutually intricated comb-like metal patterns made of aluminum, for example, and performs interconversion between a microwave voltage and a surface acoustic wave.

Moreover, the IDT itself has band-pass filter characteristics. Therefore, each excitation element 2 excites only a surface acoustic wave with a pass-band frequency specified by a predetermined center frequency with respect to an input frequency and a predetermined bandwidth. Meanwhile, each receiving element 3 receives only a surface acoustic wave with a pass-band frequency specified in a similar manner.

The IDTs of a pair of facing excitation element 2 and receiving element 3 have the same center frequency, while the IDTs of a pair of excitation elements 2 next to each other and the IDTs of a pair of receiving elements 3 next to each other have different center frequencies. The center frequencies are set to $f_1$, $f_2$, $f_3$, $f_4$, $f_5$, $f_6$, $f_7$ successively from the right-side pair of FIG. 1. $f_1$ is the lowest frequency, and the frequency increases successively in the order of $f_2$, $f_3$, $f_4$, $f_5$, $f_6$, $f_7$ so that $f_7$ is the highest frequency. However, the difference in the center frequencies between a pair of the IDTs next to each other is designed to be larger than the bandwidth of each pair.

The surface acoustic wave excited by the IDT of each excitation element 2 has a width substantially equal to the aperture of the IDT, travels almost straight to propagate across the substrate 1, and is then received by the facing receiving element 3. A region sandwiched between the excitation elements 2 and the receiving elements 3 is a detection range 1a for detecting the contact of a finger A.

The excitation elements 2 are connected to a common electrode 4 for excitation, while the receiving elements 3 are connected to a common electrode 5 for receiving. These common electrode 4 and common electrode 5 are connected to a detection circuit 10. The detection circuit 10 comprises an MPU 11, a D/A converter 12, a VCO (Voltage Controlled Oscillator) 13, a counter 14, a peak hold circuit 15, and an A/D converter 16.

The MPU 11 indicates a desired output voltage to the D/A converter 12. The indicated voltage is converted to an analog value by the D/A converter 12, and then inputted to the VCO 13. The VCO 13 oscillates at a frequency which is solely determined by the input voltage. The number of oscillations made by the VCO 13 is counted by the counter 14, and the MPU 11 measures the output frequency of the VCO 13 from the count of the counter 14. The system of the VCO 13, counter 14 and MPU 11 functions as a feedback system for enabling the VCO 13 to oscillate at a desired correct frequency. The VCO 13 is connected to the common electrode 4 for excitation, and the oscillation frequency thereof is applied to the common electrode 4. The oscillation frequency of the VCO 13 is changed at every predetermined period, and, according to each frequency, a corresponding excitation element 2 excites with the center frequency of its own IDT and a predetermined bandwidth.

Connected to the common electrode 5 for receiving is the peak hold circuit 15. The peak hold circuit 15 holds the peak voltage of the waveform received by each receiving element 3. The A/D converter 16 converts an output voltage of the peak hold circuit 15 into a digital value, and outputs the digital value to the MPU 11. The MPU 11 detects the contact position of the finger A, based on the outputs.

Note that the above-described structure illustrates the basic structure of the detection circuit 10 in a touch panel device of the present invention. In addition, an IMP matching circuit may be provided between the VCO 13 and the common electrode 4 for excitation. Further, for the effective use of a detected received signal, a circuit for amplifying the received signal or converting the received signal into another form may be provided on the receiving side. For example, it is possible to provide a circuit for performing logarithmic conversion of the received signals and reverse-converting the signals into a linier form from a certain reference value.

Referring now to FIG. 2, the following description will explain a method of fabricating the excitation elements 2 and receiving elements 3 on the substrate 1. An aluminum electrode film 21 is formed on the glass substrate 1 by using an evaporation or sputtering technique (FIG. 2(a)). Next, after forming mask patterns for the formation of IDTs by a photoresist 22 (FIG. 2(b)), IDTs 23 as aluminum electrode film patterns are formed by etching (FIG. 2(c)). A metal mask 24 having apertures at the positions where the IDTs 23 are formed is attached (FIG. 2(d)). After forming a ZnO thin film 25 to be a piezoelectric thin film by sputtering, the metal mask 24 is removed to fabricate the excitation elements 2 and the receiving elements 3, each composed of the IDT 23 and the ZnO thin film 25 (FIG. 2(e)).

Figure 3:
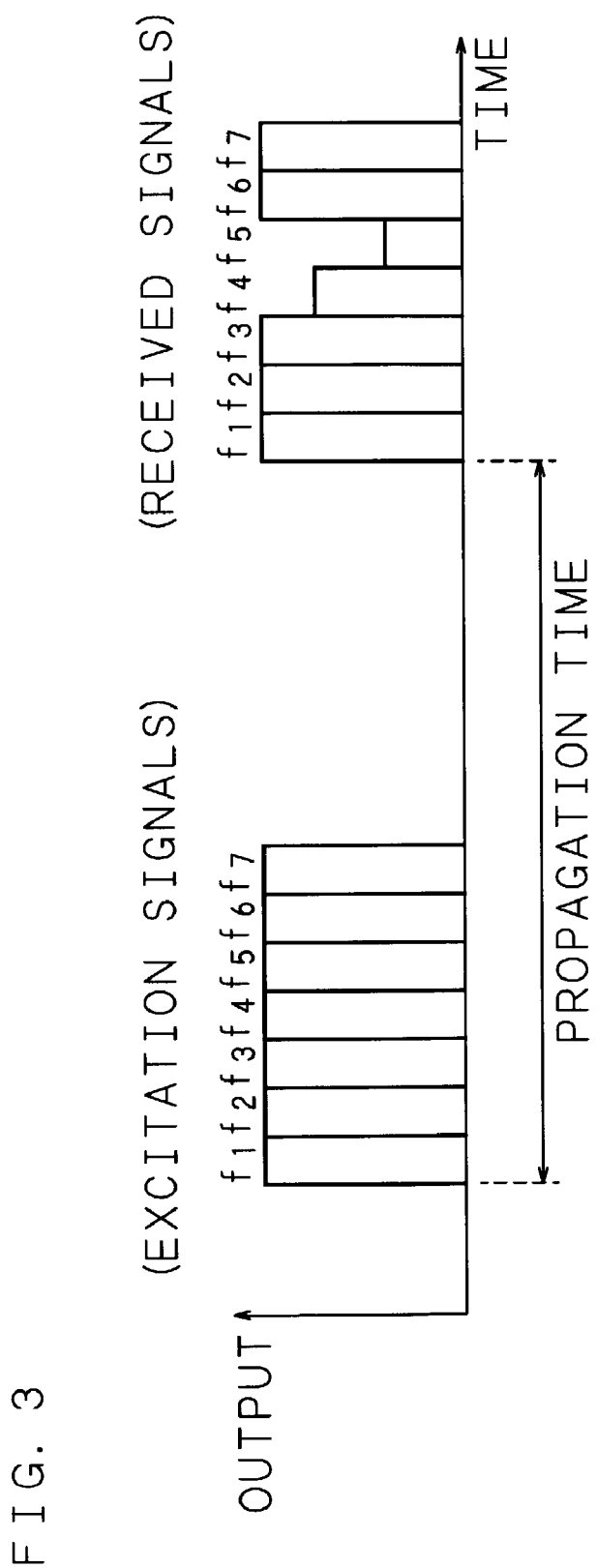
FIG. 3 is a view showing the time series of excitation signals of the excitation elements and received signals of the receiving elements.

Next, the following description will explain a contact position detecting operation performed by the touch panel device having the above-described structure. FIG. 3 is a view showing the time series of excitation signals in the excitation elements 2 and received signals in the receiving elements 3.

The voltage data is outputted from the MPU 11 to the D/A converter 12. This voltage data is converted into an analog signal by the D/A converter 12 and outputted to the VCO 13, and then a sinusoidal wave whose frequency changes periodically to $f_1$, $f_2$, $f_3$, $f_4$, $f_5$, $f_6$, $f_7$ is inputted to the common electrode 4 for excitation from the VCO 13. Moreover, at a fixed interval, the relation between the applied voltage to the VCO 13 and the oscillation frequency is measured using the feedback system of the VCO 13, counter 14 and MPU 11 so as to adjust the applied voltage to the VCO 13.

When the frequency of the input signal is $f_1$, the surface acoustic wave propagates across the substrate 1, between the excitation element 2 and the receiving element 3 whose center frequencies are $f_1$, but no surface acoustic wave propagates between pairs of excitation elements 2 and receiving elements 3 having center frequencies other than $f_1$, which are outside the bandwidth. Similarly, when the frequency of the input signal is $f_n$ (n=2, 3, 4, 5, 6, 7), the surface acoustic wave propagates across the substrate 1, between the excitation element 2 and the receiving element 3 whose center frequencies are $f_n$, but no surface acoustic wave propagates between pairs of excitation elements 2 and receiving elements 3 having center frequencies other than $f_n$, which are outside the bandwidth.

A propagated surface acoustic wave of each center frequency is received by a corresponding receiving element 3. The received signal is sent to the peak hold circuit 15 through the common electrode 5 for receiving so as to calculate the peak, and then the digital peak value is outputted from the A/D converter 16 to the MPU 11.

Here, when the substrate 1 is not touched by a finger or the like, the received signals of the surface acoustic waves of the respective center frequencies have the same amplitude level. On the other hand, when the finger A is in contact with the substrate 1 as shown in FIG. 1, surface acoustic waves whose propagation paths correspond to the contact range are blocked by the finger A, resulting in attenuation in the amplitude levels of the received signals.

In the example shown in FIG. 1, the contact range of the finger A overlaps the propagation paths of the surface acoustic waves with the center frequencies $f_4$ and $f_5$, and the contact position is closer to the latter propagation path. The amount of propagation of surface acoustic wave is lowest in the propagation path of the center frequency $f_5$ nearest to the contact position of the finger A, and then the propagation path of the center frequency $f_4$ has the second lowest amount of propagation. As a result, regarding the received signals outputted to the common electrode 5, the receiving element 3 with the center frequency $f_5$ has the lowest amplitude level, and the receiving element 3 with the center frequency $f_4$ has the second lowest amplitude level.

Accordingly, based on the peak values of the received signals at the respective center frequencies, the contact position is detectable from a propagation path having the lowest peak value. In the example shown in FIG. 1, the propagation path with the center frequency $f_5$ can be determined as the contact position. In order to detect the contact position in greater detail, the amounts of attenuation of the amplitude levels of the received signals may be compared.

In the example shown in FIG. 1, the contact position is obtained from the ratio of the amounts of attenuation between the received signals of the frequencies $f_4$ and $f_5$. More specifically, contact position X is calculated from equation (1) below.

$$X = L \times V_{14}/(V_{14} + V_{15}) \quad (1)$$

X: the distance from the center of the propagation path of the center frequency $f_5$ in the direction of the propagation path of the center frequency $f_4$.

L: the distance between the centers of the propagation paths of the center frequencies $f_4$ and $f_5$.

$V_{14}$: the amount of attenuation of the center frequency $f_4$.

$V_{15}$: the amount of attenuation of the center frequency $f_5$.

Besides, when a larger object is in contact with the substrate 1, a plurality of propagation paths are completely blocked. Therefore, the width of the contact object can be obtained from the number of the attenuated received signals. More specifically, the width W of the object is calculated from equation (2) below.

$$W = k \times L \quad (2)$$

k: the number of the attenuated received signals.

L: the distance between the centers of propagation paths next to each other when the propagation paths are positioned at equal pitch.

Figure 4:
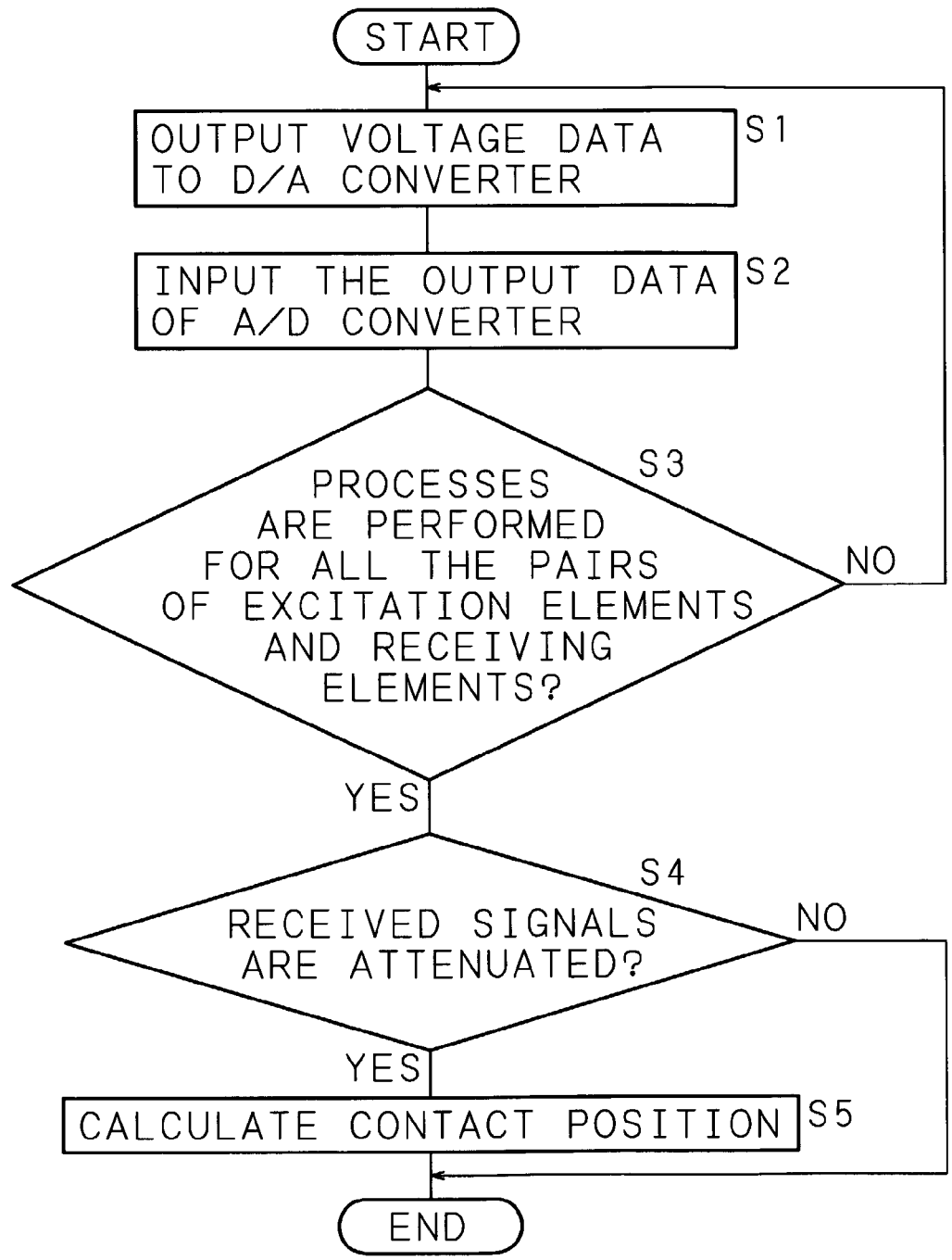
FIG. 4 is a flow chart showing the operations in an MPU.

FIG. 4 is a flow chart showing the operational procedure in the MPU 11. The voltage data is outputted from the MPU 11 to the D/A converter 12 (step S1). Then, the output data of the A/D converter 16 at a center frequency corresponding to the voltage data is inputted to the MPU 11 (step S2). The above processes are performed for all the pairs of excitation elements 2 and receiving elements 3, and, when the processes are completed (step S3: YES), a determination is made as to whether there are attenuated received signals in the received signals (step S4). If there are attenuated received signals (S4: YES), the contact position is calculated (step S5). On the other hand, if there is no attenuated received signals (S4: NO), the operation is finished without performing the process of calculating the contact position.

As described above, since the center frequencies of a pair of excitation elements 2/receiving elements 3 next to each other are different, each receiving element 3 receives only a surface acoustic wave from the facing excitation element 2 without receiving a surface acoustic wave from the next excitation element 2 which does not face this receiving element 3. Accordingly, by detecting the received signal level attenuation for the respective central frequencies, it is possible to readily detect the contact position of the finger or the object. Besides, even when a plurality of pairs of excitation elements 2 and receiving elements 3 are arranged at narrow pitch, since each of them is not affected by the next pairs, the detection performance does not deteriorate, thereby providing detection results with high accuracy.

Second Embodiment

Figure 5:
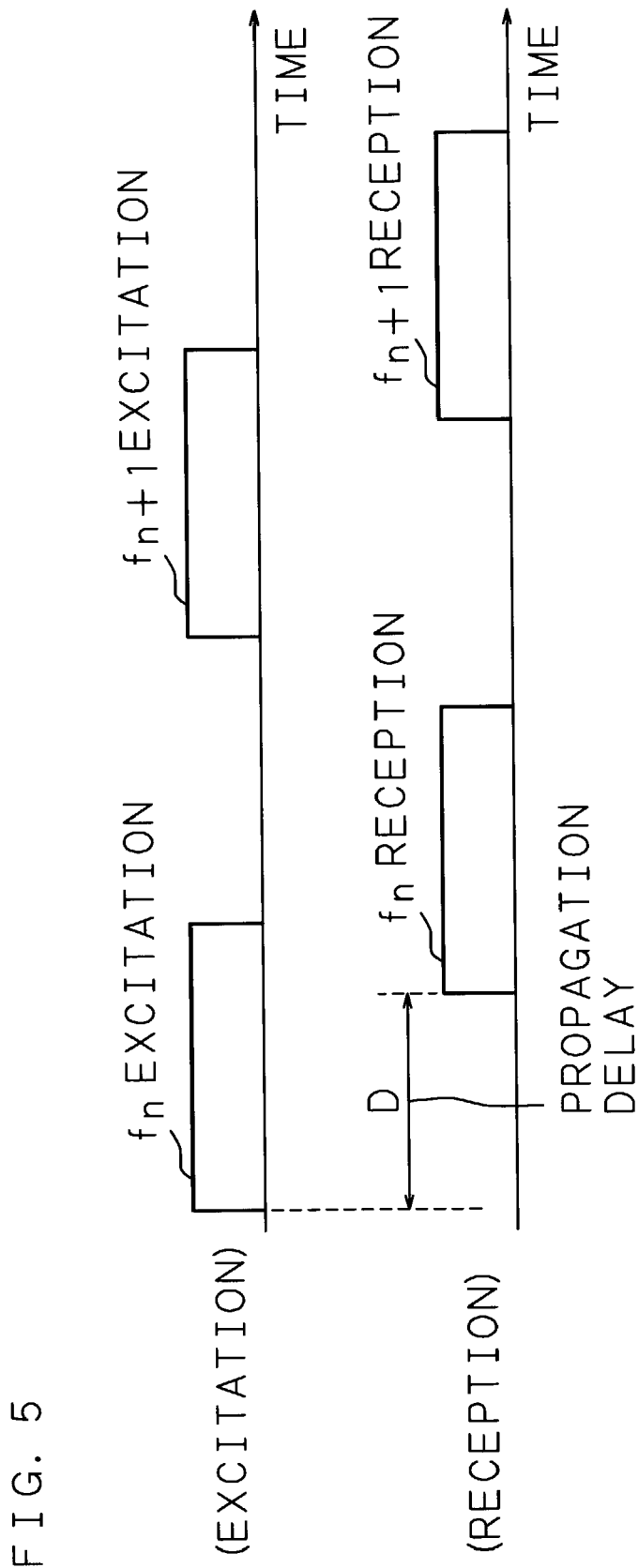
FIG. 5 is a timing chart of excitation/receiving processes in the first embodiment.

FIG. 5 is a timing chart showing the excitation/receiving processes performed in the above-described touch panel device of the first embodiment. In this example, after completing the excitation process and receiving process at the center frequency $f_n$, the next excitation process at the center frequency $f_{n+1}$ is started. Since the surface acoustic wave is an acoustic wave, the propagation velocity thereof is extremely low as compared to that of an electric signal, and thus there may be a problem of process delay. In FIG. 5, D indicates the delay time in the propagation from the excitation element 2 to the receiving element 3. Accordingly, since it takes a long time to complete the excitation process and receiving process for all the pairs, the contact position can not be detected quickly.

Figure 6:
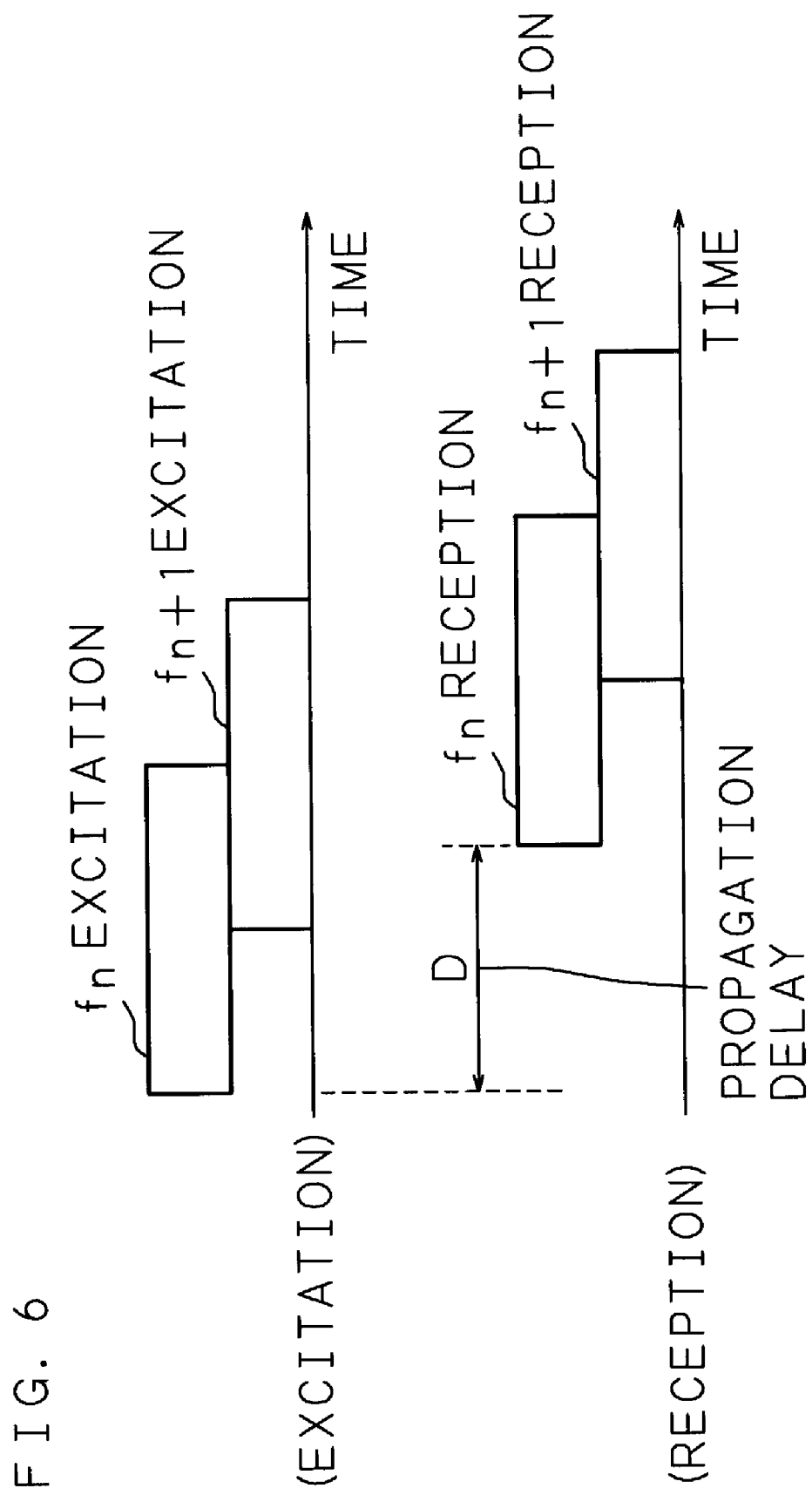
FIG. 6 is a timing chart of excitation/receiving processes in the second embodiment.
Figure 7:
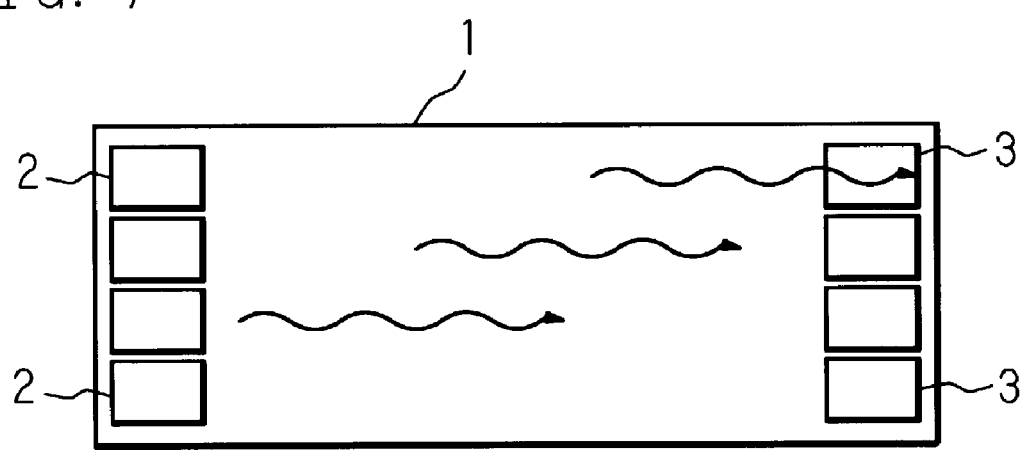
FIG. 7 is a schematic view showing the propagating state of surface acoustic waves in the second embodiment.

FIG. 6 is a timing chart showing the excitation/receiving processes performed in a touch panel device of the second embodiment, and FIG. 7 is a schematic view showing the propagating state of the surface acoustic waves therein. In this example, without waiting for the completion of the excitation process at the center frequency $f_n$, the next excitation process at the center frequency $f_{n+1}$ is started. Accordingly, it is possible to solve the delay problem, which is a disadvantage of using surface acoustic waves, and quickly detect the contact position.

Third Embodiment

In the second embodiment, in a pair of excitation element 2 and receiving element 3, the excitation process in the excitation element 2 continues until the receiving element 3 starts the receiving process. However, it is not necessary to excite the excitation element 2 for such a long time, and the excitation element 2 needs to be excited only for a time sufficient for the receiving process in the receiving element 3.

Figure 8:
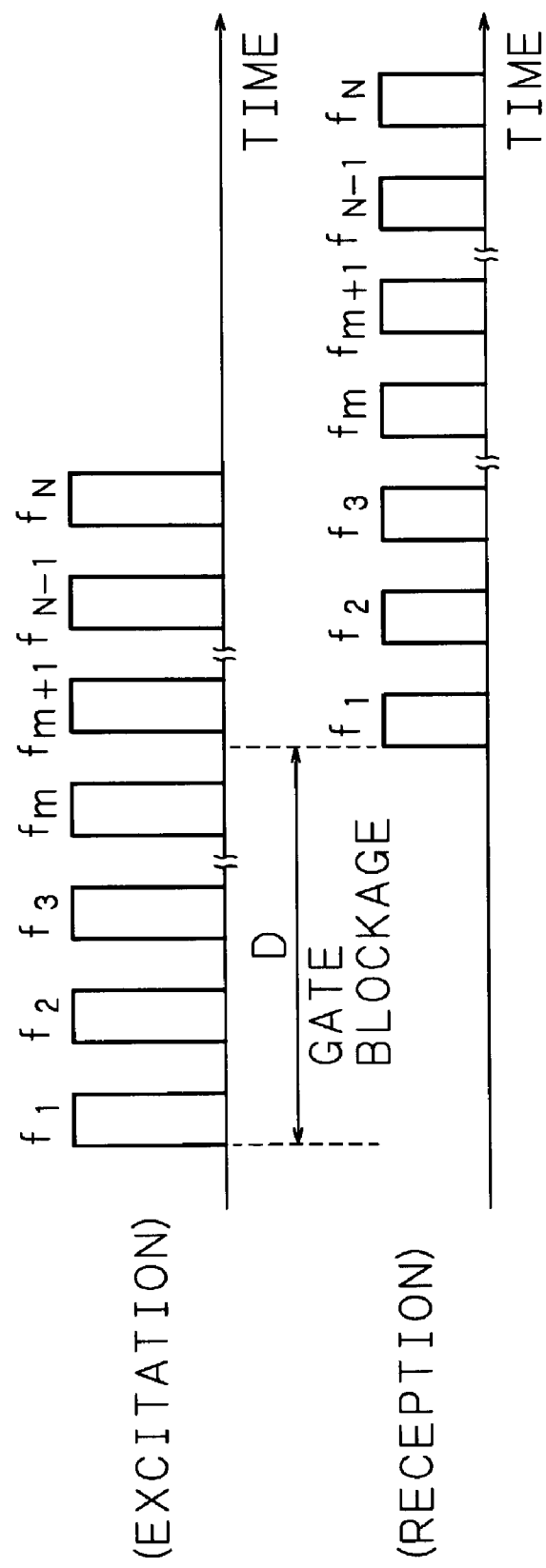
FIG. 8 is timing chart of excitation/receiving processes in the third embodiment.

FIG. 8 is a timing chart showing the excitation/receiving processes performed in a touch panel device of the third embodiment, and FIGS. 9(a) and 9(b) are schematic views showing the propagating state of the surface acoustic waves therein. In this example, the excitation time in each of the excitation elements 2 for the center frequencies $f_1, f_2, \ldots f_n$ is set to the time sufficient for the receiving process in the receiving elements 3.

More specifically, each excitation time is about the time obtained by dividing the length of the IDT of the receiving element 3 by the velocity of the surface acoustic wave across the substrate 1. Moreover, the excitation stopping time due to an intermittent burst change is set no longer than the time obtained by dividing the distance between the IDT of the excitation element 2 and the IDT of the receiving element 3 by the velocity of the surface acoustic wave across the substrate 1. The surface acoustic wave generated by a burst excitation signal has a maximum strength at the crossing time equal to the length of the IDT of the receiving element 3, and, the strength is fixed when the excitation time is longer than this. Therefore, excitation is stopped when the surface acoustic wave reaches the maximum strength.

Accordingly, like the second embodiment, it is possible to solve the detection delay problem and efficiently perform the excitation/receiving processes, thereby producing a significant effect in reducing the power consumption. FIGS. 9(a) and 9(b) illustrate such examples, and FIG. 9(b) shows an example of the shortest time when the excitation stop period=0.

Besides, each of the receiving elements 3 is designed not to perform the receiving process for only a delay time (D in FIG. 8) at the initial stage of excitation by means of a blocking process. It is thus possible to prevent detection errors due to the influence of noise. According to the design of the touch panel device, this delay time can be given by dividing the distance between the IDT of the excitation element 2 and the IDT of the receiving element by the velocity of the surface acoustic wave across the substrate 1. Further, in this case, as the blocking process, it is possible to apply physical blockage by means of a gate IC, the addition of the process of prohibiting the receiving process by firmware, etc.

Figure 10:
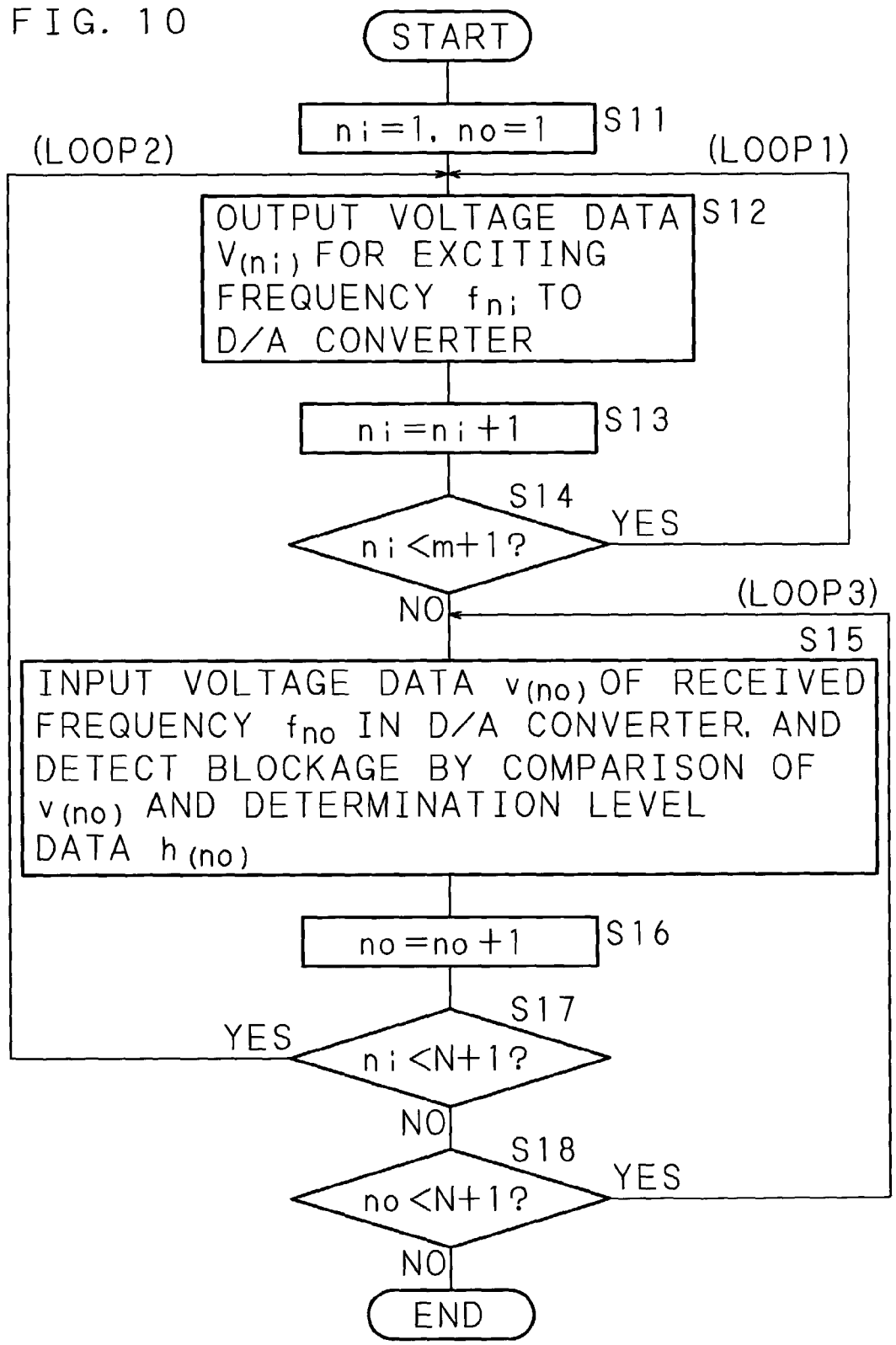
FIG. 10 is a flow chart showing the operational procedure in the MPU of the third embodiment.

FIG. 10 is a flow chart showing the operational procedure in the MPU 11 according to the second and third embodiments. In the touch panel device comprising pairs of IDTs with the center frequencies $f_1, \ldots f_n$ for successively exciting/receiving surface acoustic waves having the respective center frequencies, $V_{(ni)}$ is the voltage data for exciting a frequency $f_{ni}$, and $v_{(no)}$ is the received voltage data for a frequency $f_{no}$. Additionally, m represents the number of frequencies transmitted during the gate block time D in FIG. 8.

This flow chart includes a loop (Loop 1) in which only the excitation operation is executed without performing the receiving operation; a loop (Loop 2) in which the excitation operation and the receiving operation are executed simultaneously; a loop (Loop 3) in which only the receiving operation is executed without performing the excitation operation.

In order to perform initialization, initial value 1 is given to ni and no (step S11). The voltage data $V_{(ni)}$ for exciting the frequency $f_{ni}$ is outputted to the D/A converter 12 from the MPU 11 (step S12). ni is incremented only by 1 so as to set a number corresponding to the next frequency (step S13). A determination is made as to whether ni has reached m+1, i.e., whether the frequency $f_m$ has been excited (step S14). If ni has not reached m+1 (S14: YES), the process returns to S12 according to Loop 1.

The voltage data $v_{(no)}$ of the received frequency $f_{no}$ in the D/A converter 12 is inputted to the MPU 11, and the voltage data $v_{(no)}$ is compared with preset determination level data $h_{(no)}$ so as to detect whether the surface acoustic wave was blocked (step S15). no is incremented only by 1 so as to set a number corresponding to the next frequency (step S16).

A determination is made as to whether ni has reached N+1, i.e., whether the frequency $f_N$ has been excited (step S17). If ni has not reached N+1 (S17: YES), the process returns to S12 according to Loop 2.

A determination is made as to whether no has reached N+1, i.e., whether the frequency $f_N$ has been received (step S18). If no has not reached N+1 (S18: YES), the process returns to S15 according to Loop 3. If no has reached N+1 (S18: NO), the process is completed.

Note that the above-described operation can also be realized by an interrupting operation which is implemented by starting the inputting of a received signal.

Fourth Embodiment

Figure 11:
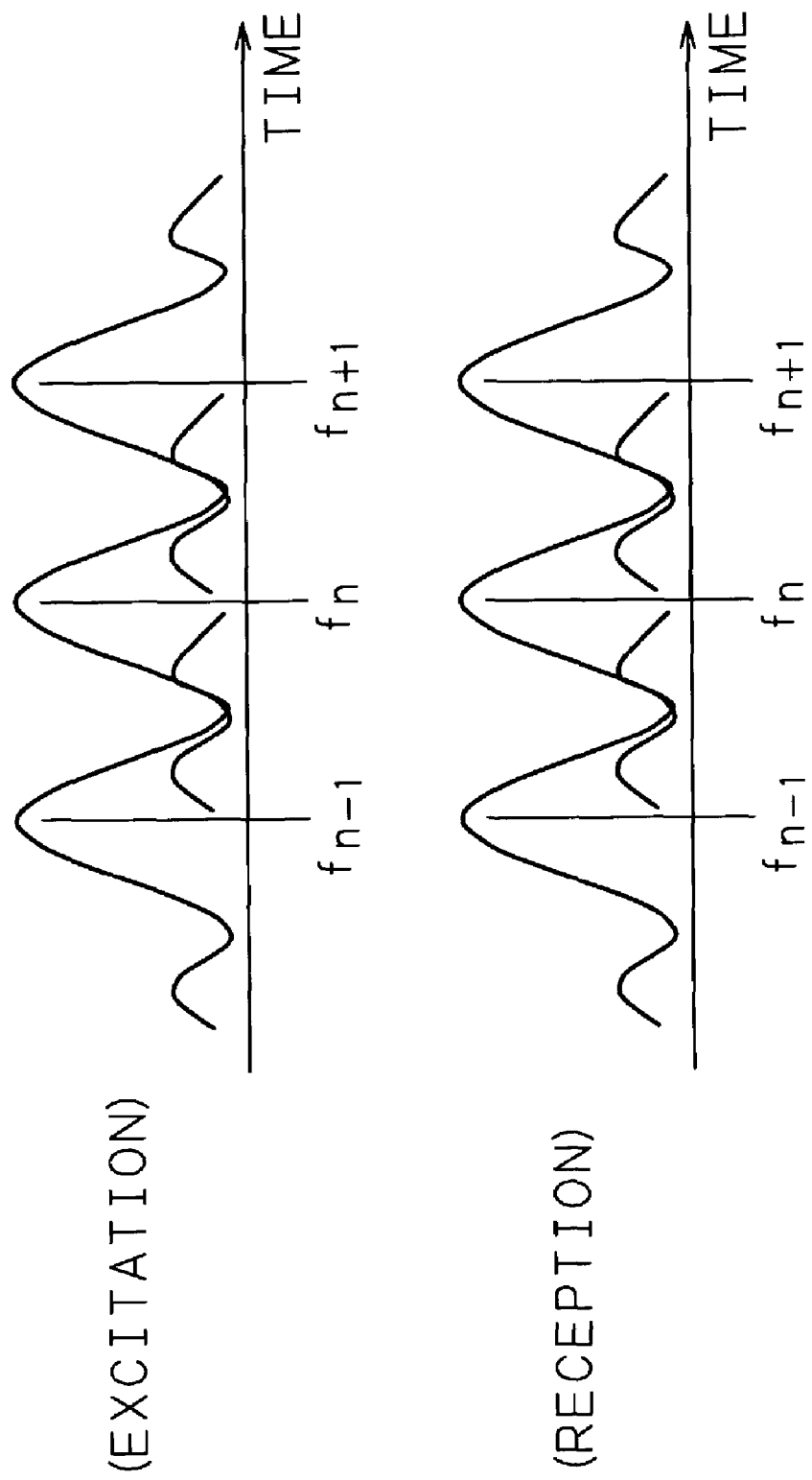
FIG. 11 is a view showing the frequency characteristics of the surface acoustic waves of the IDTs of the first embodiment.

FIG. 11 is a view showing the frequency characteristics of surface acoustic waves of the IDTs in the above-described touch panel device of the first embodiment. The received center frequencies $f_{n-1}, f_n, f_{n+1}$ correspond one-to-one to the excitation center frequencies $f_{n-1}, f_n, f_{n+1}$, and the respective propagation paths are separated and specified by this one-to-one correspondence.

Here, if it is possible to obtain not only received results corresponding to the center frequencies, but also interpolation received results corresponding to other frequencies between these center frequencies, then the contact position is detected with greater accuracy.

Figure 12:
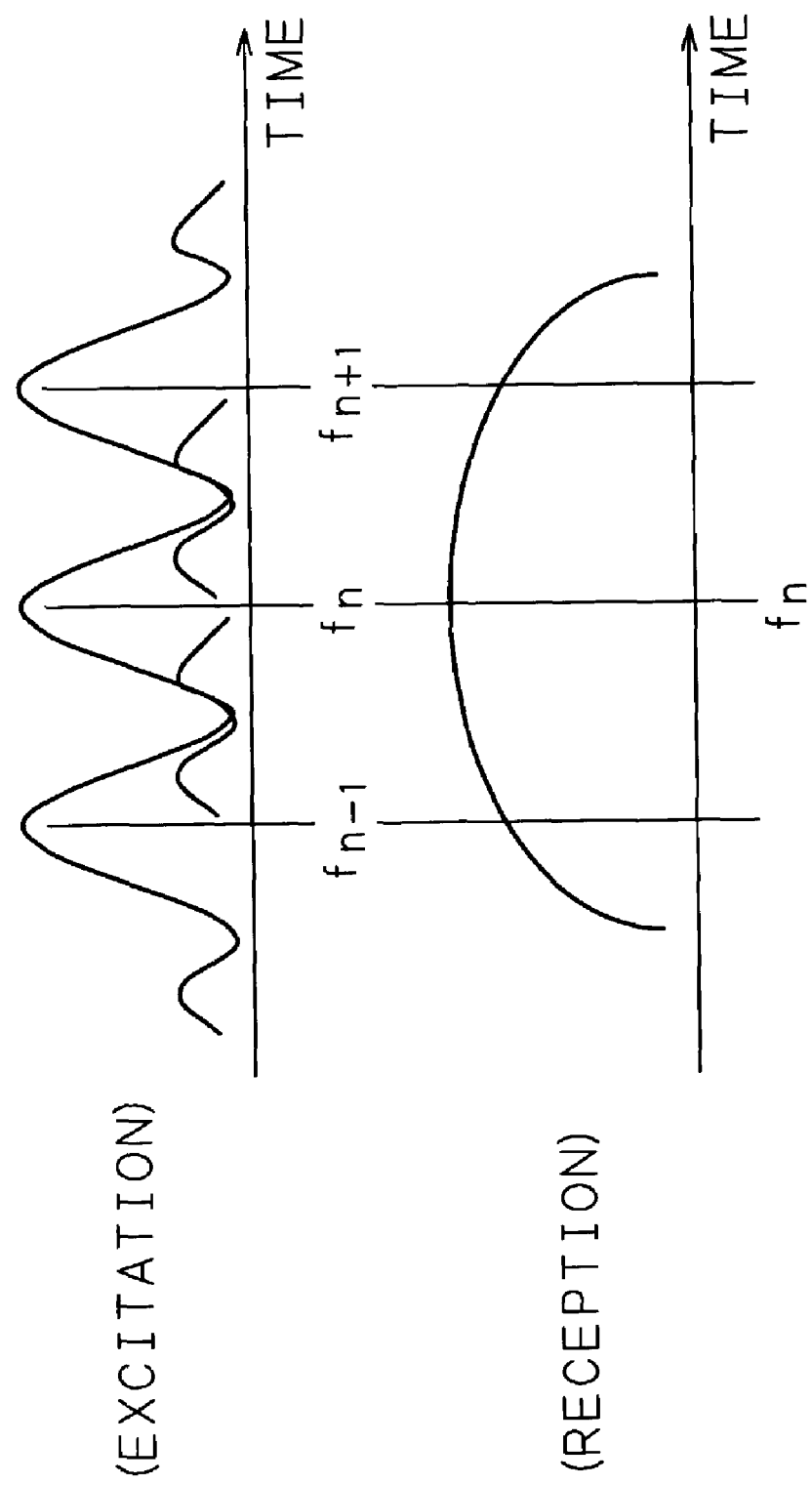
FIG. 12 is a view showing the frequency characteristics of the surface acoustic waves of the IDTs of the fourth embodiment.

In the fourth embodiment, one receiving element 3 is designed to form a pair with a plurality of excitation elements 2. FIG. 12 is a view showing the frequency characteristics of surface acoustic waves of the IDTs in a touch panel device of the fourth embodiment. With respect to an excitation frequency, wide-band frequency characteristics are realized on the receiving side. It is therefore possible to obtain interpolative received results, instead of the one-to-one correspondence as shown in FIG. 11. Note that, contrary to this, even when the touch panel device is designed to have the wide-band frequency characteristics on the excitation side with respect to the receiving frequencies, similar effects are obtained.

Fifth Embodiment

Figure 13:
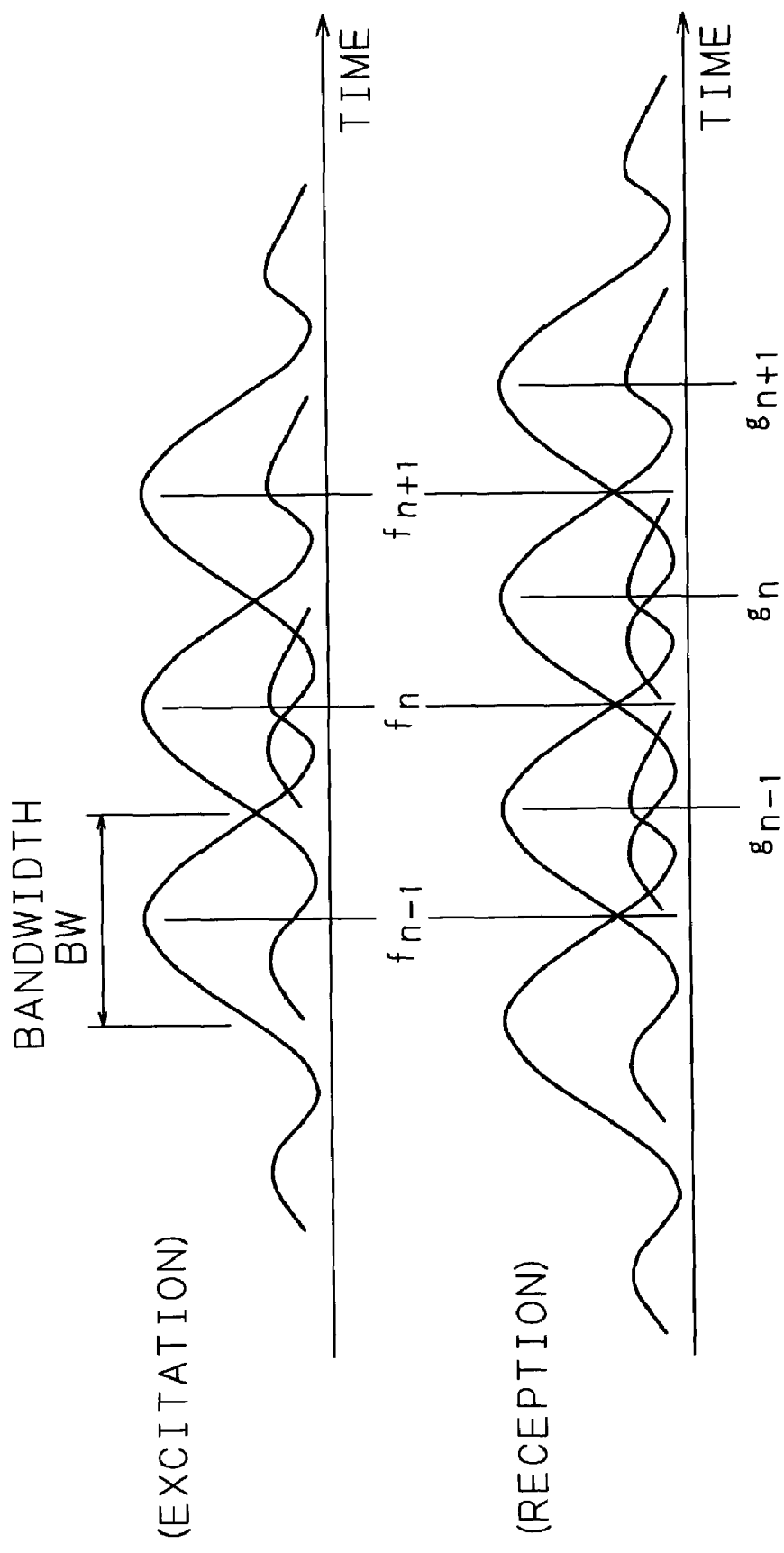
FIG. 13 is a view showing the frequency characteristics of the surface acoustic waves of the IDTs of the fifth embodiment.

FIG. 13 is a view showing the frequency characteristics of surface acoustic waves of the IDTs in a touch panel device of the fifth embodiment. The center frequencies of the IDTs of the corresponding excitation element 2 and receiving element 3 are shifted from each other by a half of the bandwidth. In other words, a relation shown by equation (3) below is established between the excitation center frequency $f_n$ and the receiving center frequency $g_n$, providing that the bandwidth is BW.

$$g_n = f_n + BW/2 \tag{3}$$

In this fifth embodiment, like the fourth embodiment, it is possible to obtain interpolative received results, thereby improving the detection accuracy.

Sixth Embodiment

Figure 14:
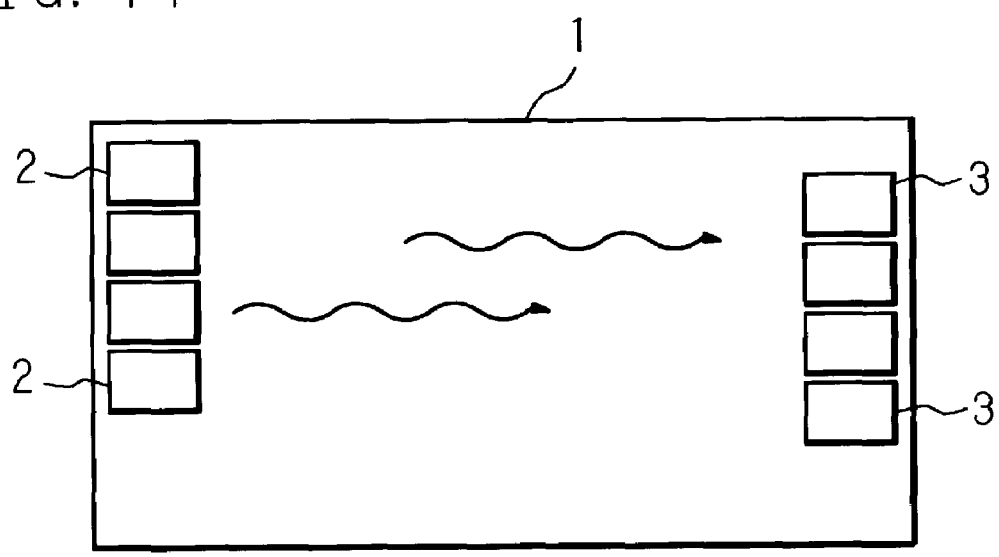
FIG. 14 is a view showing the arrangement of the excitation elements/receiving elements and the propagating state of the surface acoustic waves in the sixth embodiment.

FIG. 14 is a schematic view showing the arrangement of the excitation elements 2 and receiving elements 3 and the propagation state of surface acoustic waves in a touch panel device of the sixth embodiment. In this example, the positions of the IDTs of the excitation element 2 and receiving element 3 are physically shifted from each other so as to obtain interpolative received results and improve the detection accuracy as in the fourth and fifth embodiments. Note that, in the example shown in FIG. 14, the positions are shifted from each other by a half of the aperture width of the IDT.

Seventh Embodiment

FIGS. 15(a), 15(b), 15(c) are schematic views showing the arrangement of the excitation elements 2 and receiving elements 3 and the propagation state of surface acoustic waves in a touch panel device of the seventh embodiment in which the excitation elements 2 and receiving elements 3 are arranged in a plurality of stages for the same purpose as in the sixth embodiment. FIG. 15(a) illustrates an example in which the excitation elements 2 and receiving elements 3 are arranged in two stages by shifting them to the front and back positions. FIG. 15(b) illustrates an example in which the excitation elements 2 and receiving elements 3 are arranged in two stages in the same manner, and the propagation time of the surface acoustic waves is fixed. In this example, there is no phase shift between the respective surface acoustic waves. FIG. 15(c) illustrates an example in which the scan direction of excitation in the excitation elements 2 and the receiving direction in a plurality of stages of receiving elements 3 are designed to be the same direction.

Eighth Embodiment

Figure 16:
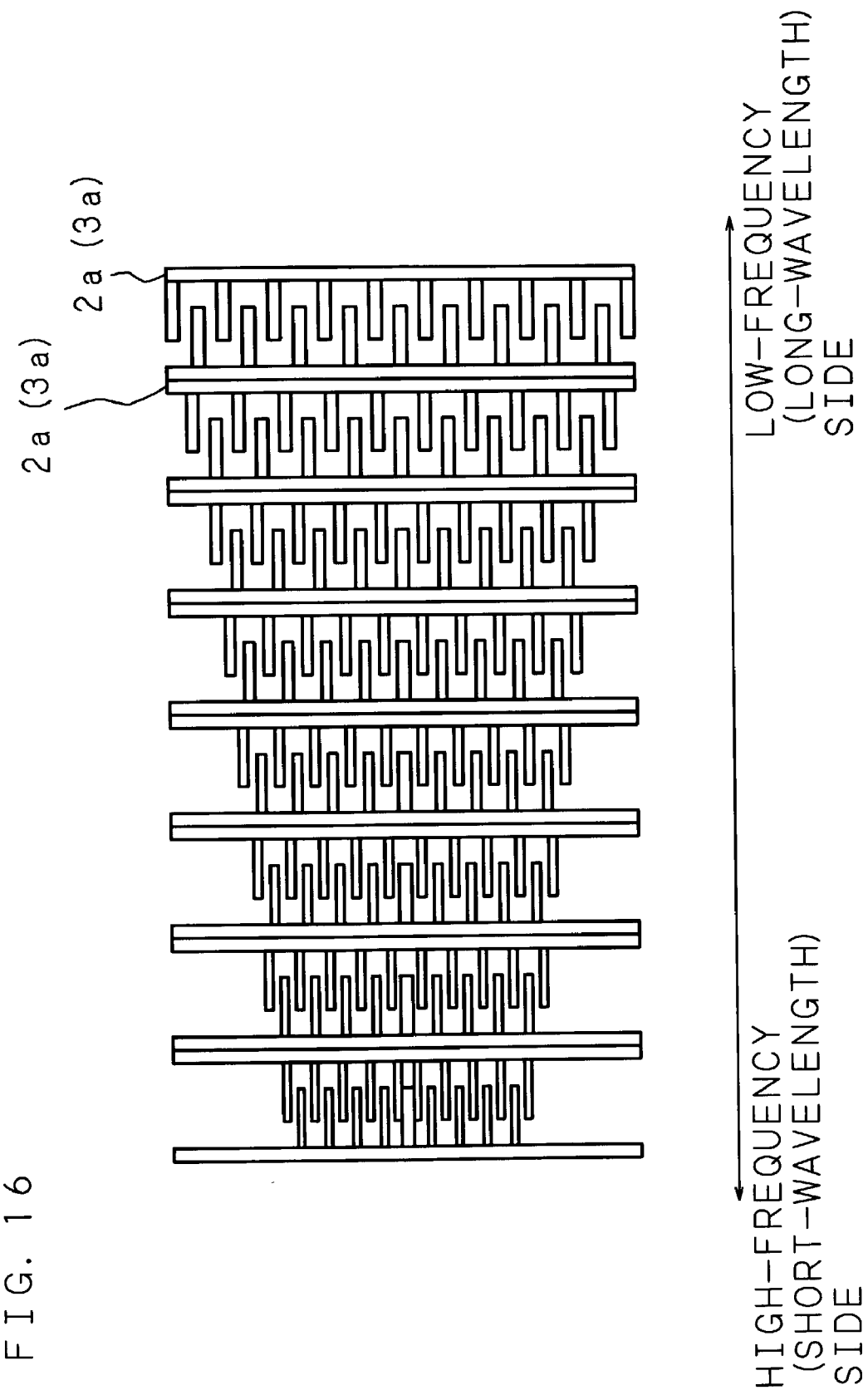
FIG. 16 is a view showing the electrode structures of the IDTs when the number of pairs of the electrodes in the respective IDTs is fixed.

FIG. 16 is a view showing the electrode structure in an IDT 2a (3a) when the number of electrode pairs in each of the IDTs 2a of the excitation elements 2 (each of the IDTs 3a of the receiving elements 3) is fixed. If the number of electrode pairs is fixed and the frequency is changed, since the wavelength changes, the distance between the electrodes changes. As a result, the overall length of each IDT 2a (3a)

changes, and the overall length is longer on the low-frequency (long-wavelength) side. In this example, since a bandwidth ratio with respect to a frequency is determined by the number of electrode pairs, it is set to the bandwidth on the low-frequency side in order to realize a fixed-pitch frequency change. Consequently, the device structure becomes larger in size.

Figure 17:
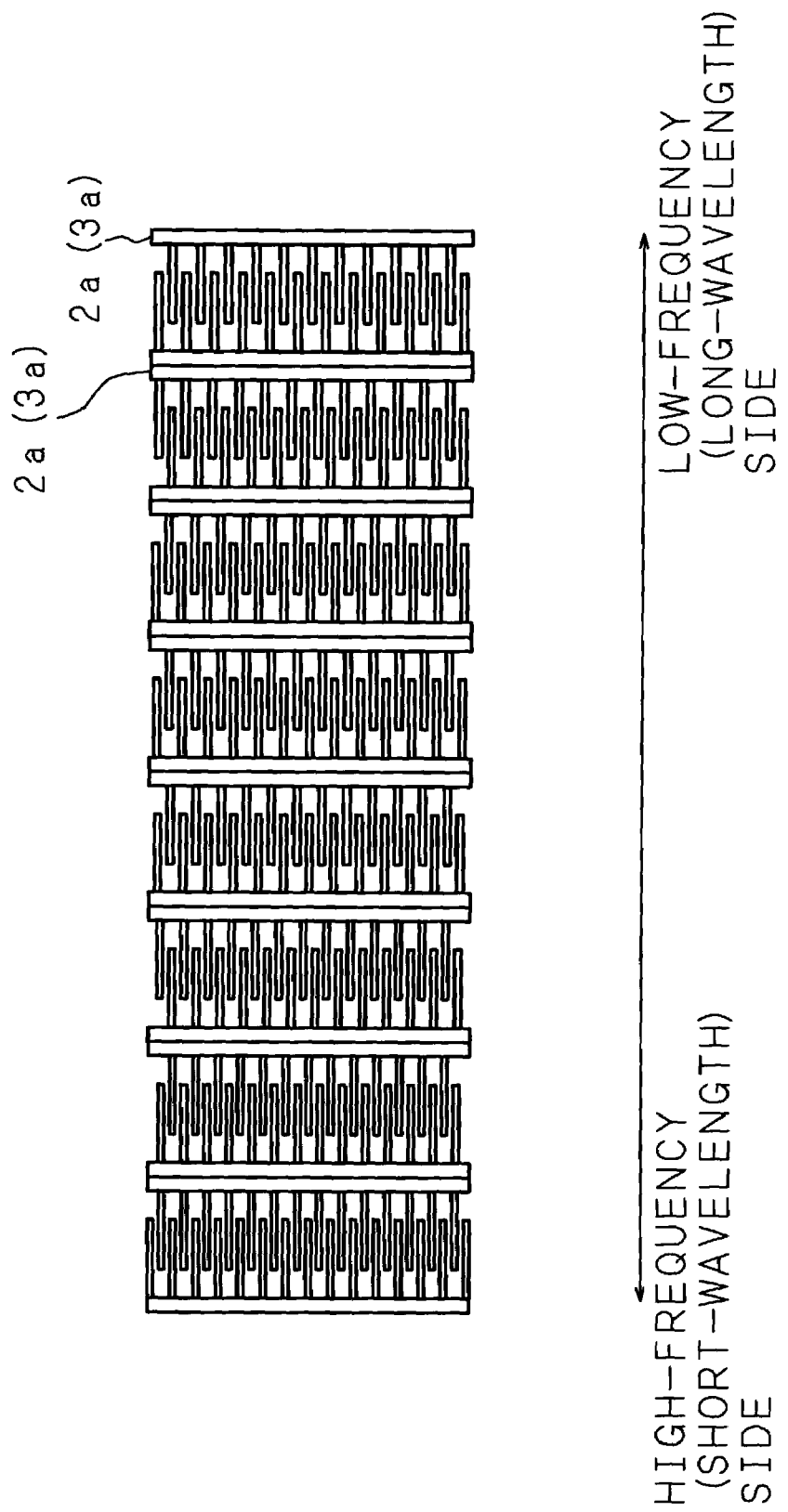
FIG. 17 is a view showing the electrode structures of the IDTs when the frequency is changed within a certain width in the eighth embodiment.

FIG. 17 is a view showing the electrode structure of the IDT 2a (3a) when the frequency is changed within a fixed width. In this example, the number of electrode pairs in each IDT 2a (3a) is variable, and the number of pairs is changed so as to have a uniform frequency shift. Accordingly, it is possible to limit the overall length of each IDT 2a (3a) to a predetermined length or less, thereby achieving a small-sized device structure.

Ninth Embodiment

Figure 18:
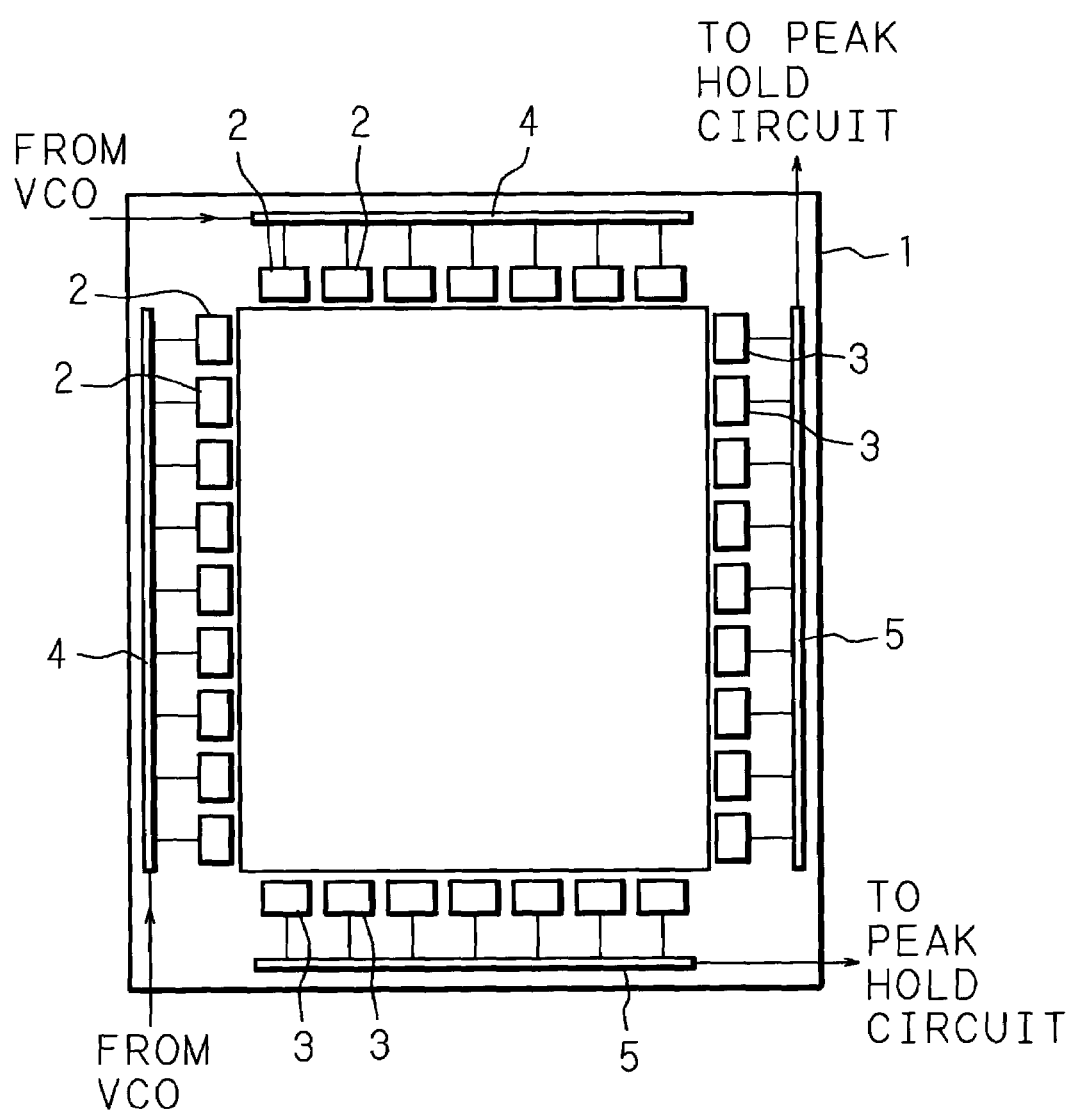
FIG. 18 is a schematic view showing the basic structure of the ninth embodiment.

FIG. 18 is a schematic view showing the basic structure of a touch panel device according to the ninth embodiment. In addition to one set of a plurality of pairs of excitation elements 2 and receiving elements 3 shown in FIG. 1, another set of a plurality of pairs of excitation elements 2 and receiving elements 3 is formed on the remaining two ends of the substrate 1 so that the excitation elements 2 and the receiving elements 3 face each other. In the ninth embodiment, as described above, since the two sets of a plurality of pairs of the excitation elements 2 and receiving elements 3 are arranged orthogonally, it is possible to detect the two-dimensional contact position of a finger or an object.

FIRST EXAMPLE

Figure 19:
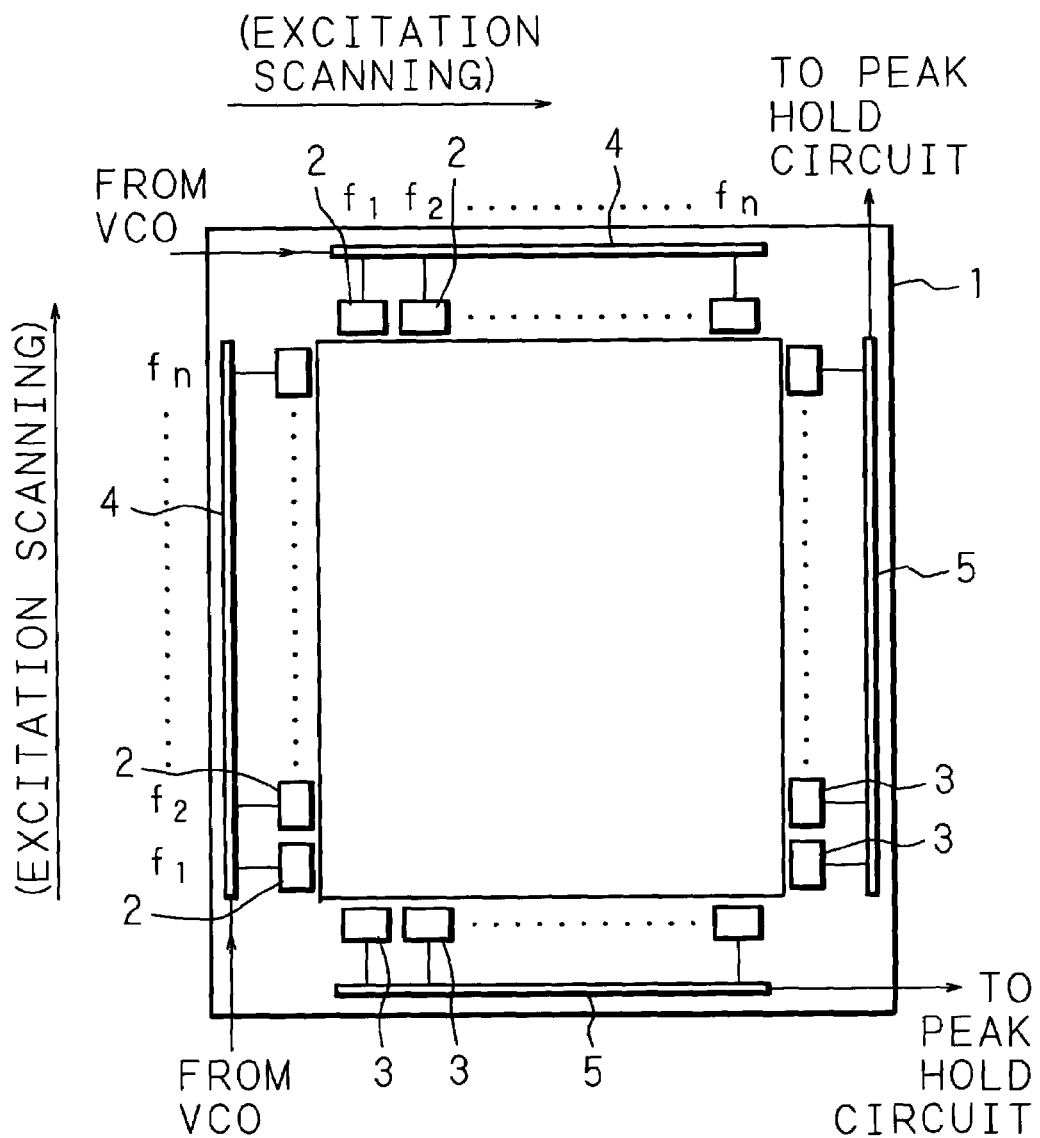
FIG. 19 is a view showing the driving state of the first example of the ninth embodiment.

FIG. 19 is a view showing the driving state in the first example of the ninth embodiment. In this example, the excitation process in each set of the excitation elements 2 is performed independently, and the receiving process in each set of the receiving elements 3 is also carried out independently. It is thus possible to readily perform these processes.

Next, the following description will explain the second through fourth examples which were designed to simplify the circuit by performing operations common to the processes in the respective sets.

SECOND EXAMPLE

Figure 20:
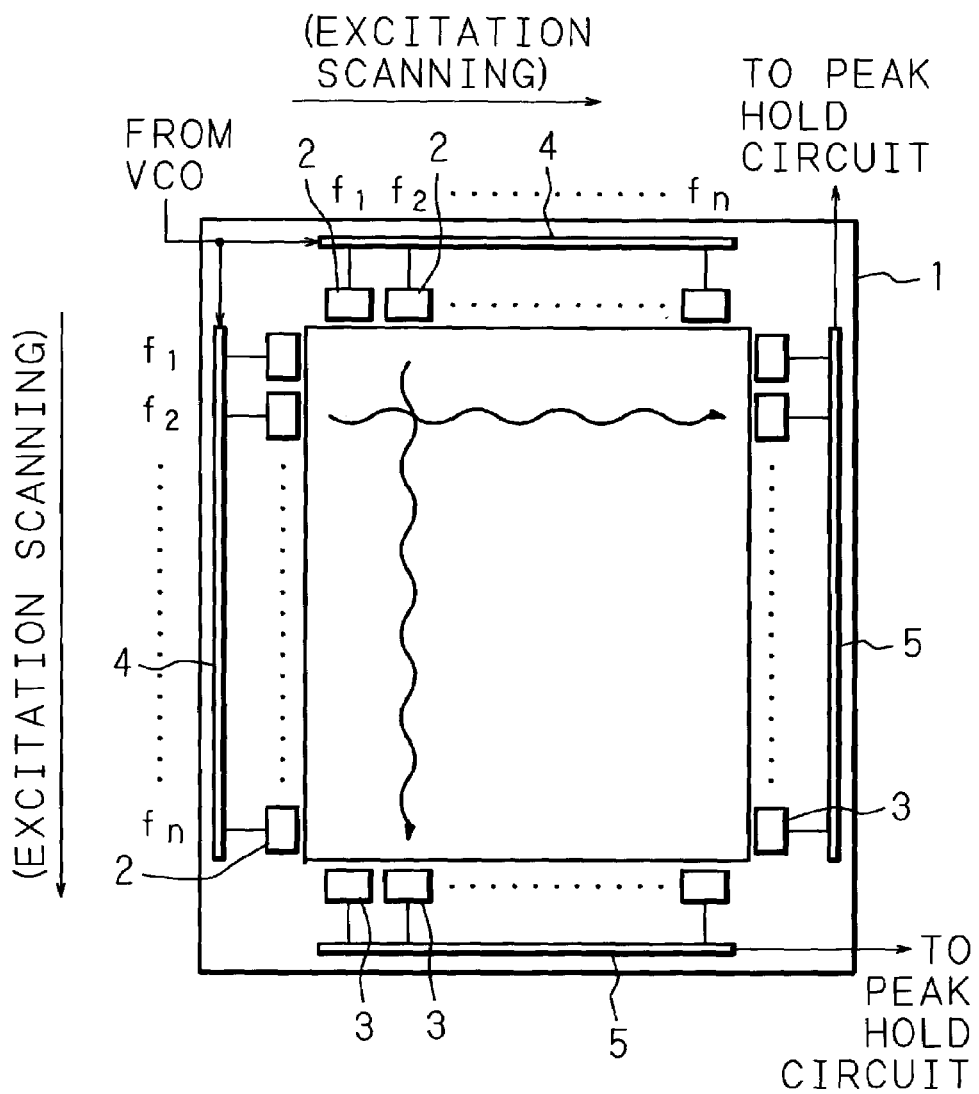
FIG. 20 is a view showing the driving state of the second example of the ninth embodiment.

FIG. 20 is a view showing the driving state in the second example of the ninth embodiment. In this example, a driving circuit is shared between the two sets of the excitation elements 2. One set of the excitation elements 2 and the other set of the excitation elements 2 are excited at the center frequencies $f_1, f_2, \ldots f_n$ successively with the same timings. Accordingly, it is possible to simultaneously perform frequency scanning, thereby shortening the processing time.

THIRD EXAMPLE

Figure 21:
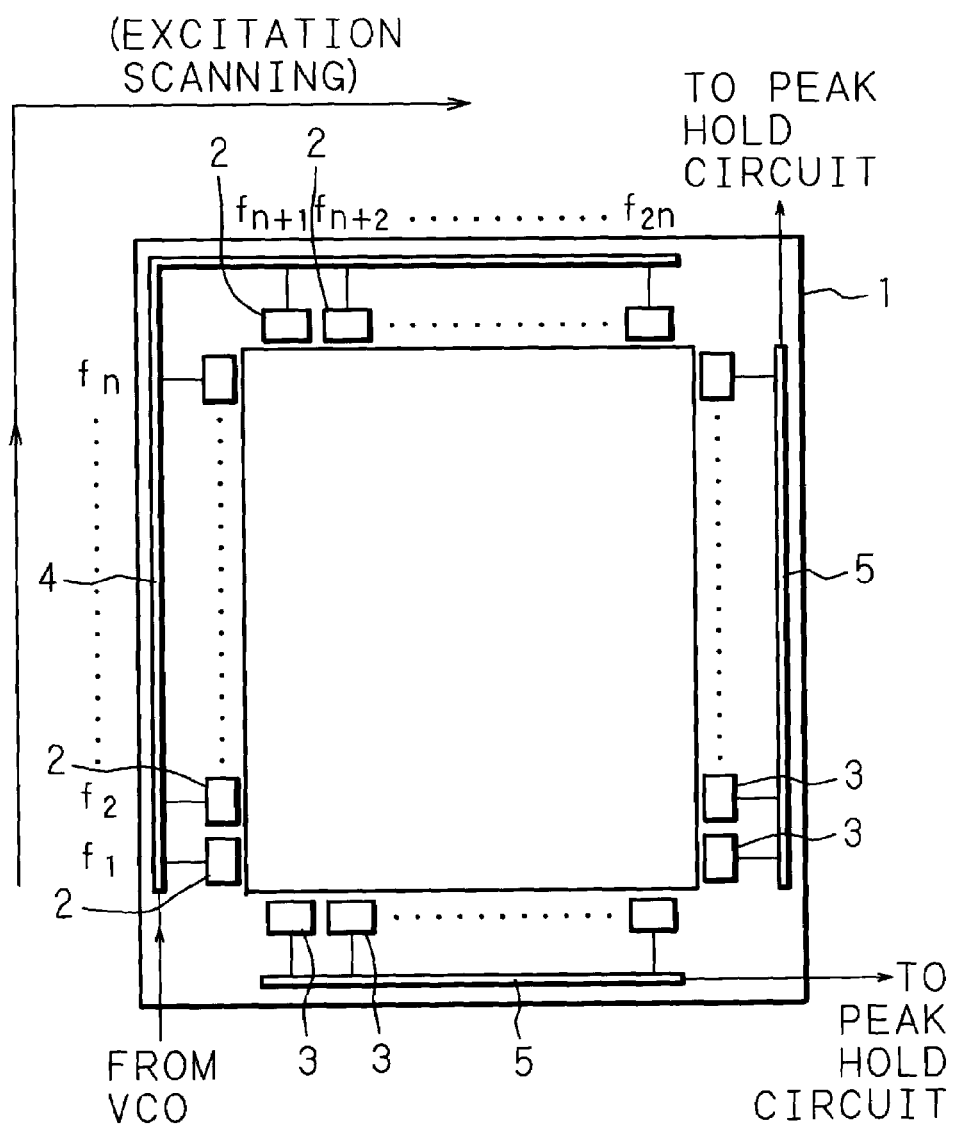
FIG. 21 is a view showing the driving state of the third example of the ninth embodiment.

FIG. 21 is a view showing the driving state in the third example of the ninth embodiment. In this example, both sets of the excitation elements 2 are connected to a single common electrode 4. After exciting one set of the excitation elements 2 at the center frequencies $f_1, f_2, \ldots, f_n$ successively, the other set of the excitation elements 2 are excited at the center frequencies $f_{n+1}, f_{n+2}, \ldots f_{2n}$ successively. Unlike the first example, surface acoustic waves in two directions are not generated simultaneously, and thus this structure is hardly affected by noise.

FOURTH EXAMPLE

Figure 22:
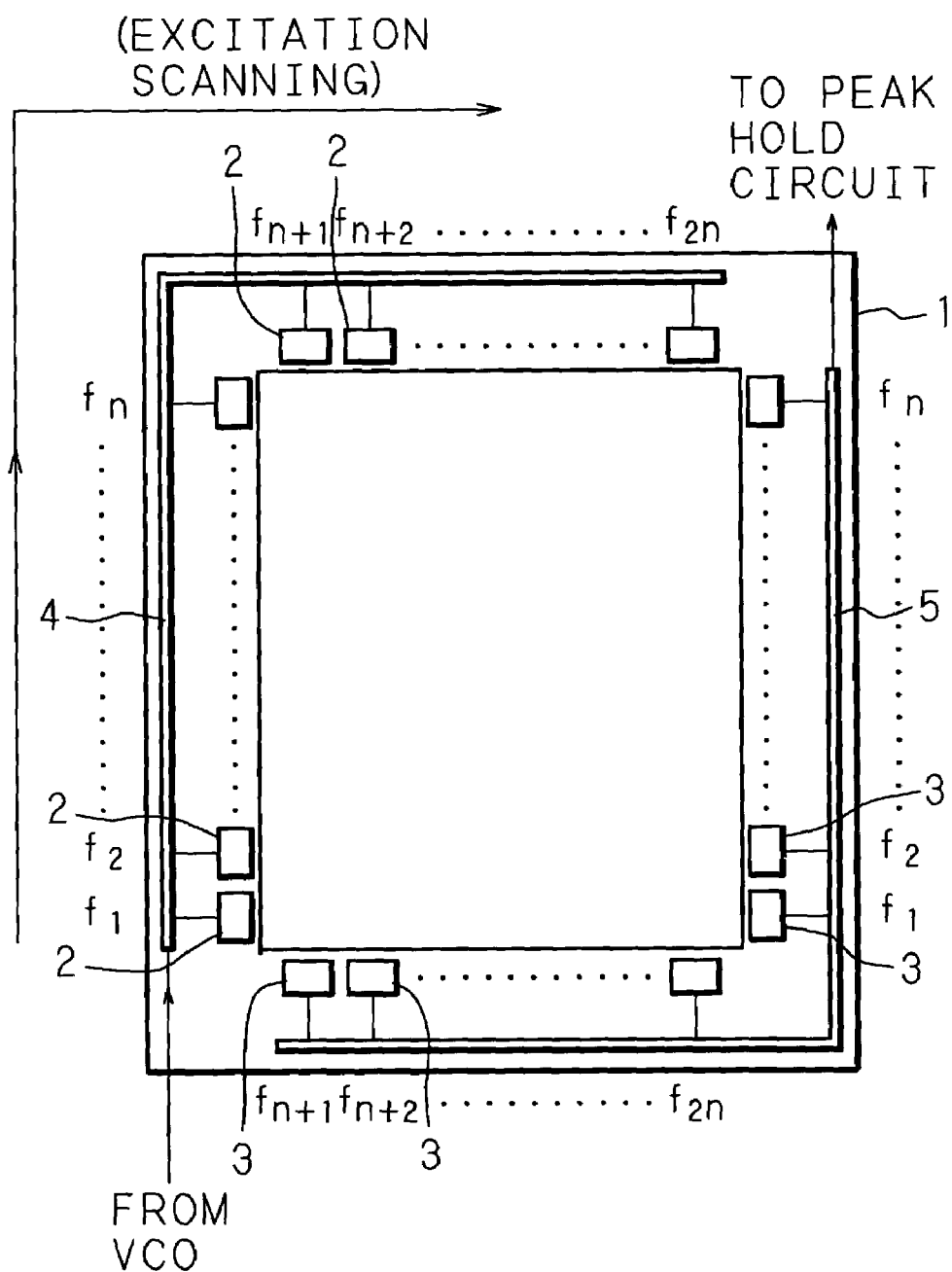
FIG. 22 is a view showing the driving state of the fourth example of the ninth embodiment.

FIG. 22 is a view showing the driving state in the fourth example of the ninth embodiment. In this example, both sets of the excitation elements 2 are connected to a single common electrode 4 in the same manner as in the third example, and both sets of the receiving elements 3 are connected to a single common electrode 5. The circuit structure can be simplified to a maximum extent.

Tenth Embodiment

Figure 23:
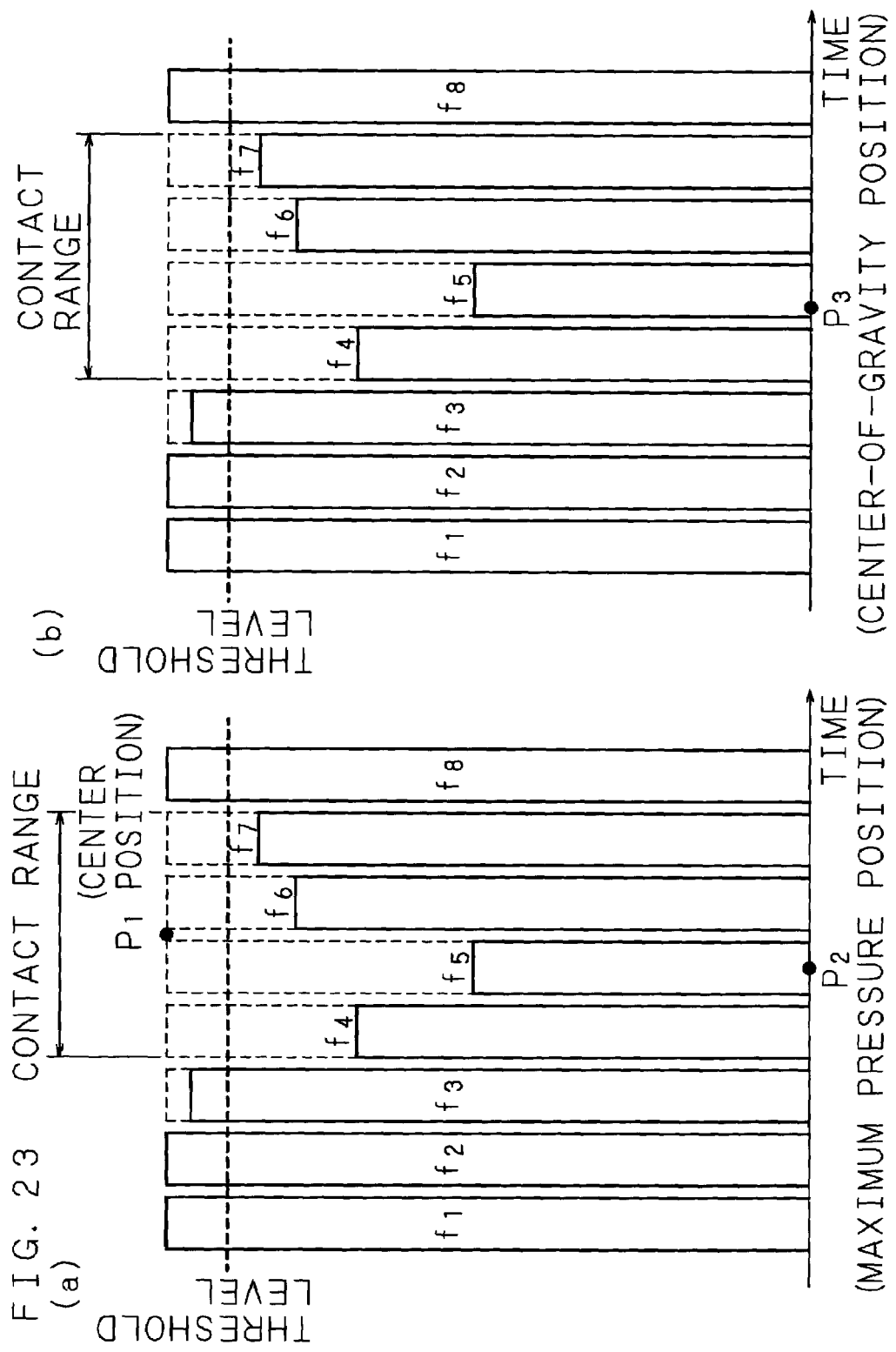
FIGS. 23(a) and 23(b) are views showing how the contact position is determined based on the levels of the received signals.

FIGS. 23(a) and 23(b) are views showing a method for determining the contact position, based on the levels of the received signals in the receiving elements 3. In these figures, the broken line indicates a threshold level for determining the presence or absence of attenuation of surface acoustic waves, and, in this example, the levels of the received signals in the receiving elements 3 with the center frequencies $f_4, f_5, f_6, f_7$ are lower than this threshold level and these four lines of propagation paths are the contact range. With respect to such a received level pattern, the contact position is determined by three types of methods as described below.

As shown in FIG. 23(a), the center position $P_1$ of the four propagation paths where the surface acoustic waves were blocked is determined as the contact position. Or, as shown in FIG. 23(a), the center position $P_2$ of the propagation path with the center frequency $f_5$ where the maximum attenuation was provided is determined as a position where the maximum pressure was applied, and thus the contact position. Alternatively, as shown in FIG. 23(b), the center-of-gravity position $P_3$ calculated based on the amounts of attenuation in the four propagation paths is determined as the contact position.

Figure 24:
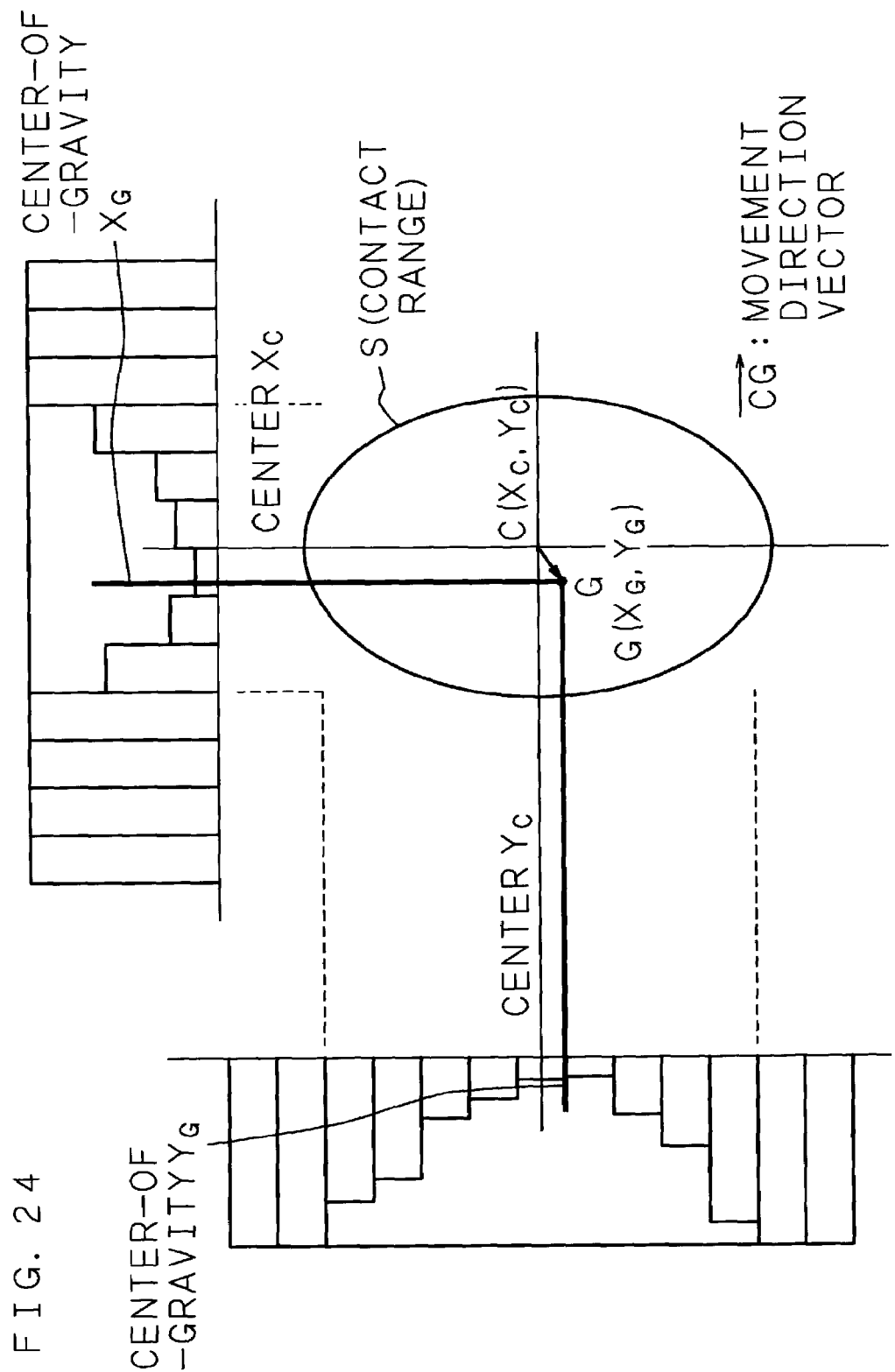
FIG. 24 is a view showing a movement direction vector for estimating the movement of a finger.

FIG. 24 is a view showing a movement direction vector for estimating the movement of the finger. In FIG. 24, S indicates the two-dimensionally detected contact range of the finger, and the coordinates of the center C thereof are denoted by $(X_C, Y_C)$. Moreover, the coordinates of the center-of-gravity G calculated based on the amounts of attenuation of the obtained received signals are denoted by $(X_G, Y_G)$. Here, a vector starting at the center C and ending at the center-of-gravity G is defined as a movement direction vector. By calculating the direction of this movement direction vector (vector CG), it is possible to estimate the direction of the movement of the finger.

By the way, in the above-described embodiments, although the contact position is detected based on the difference in the center frequencies of the surface acoustic waves, it is also possible to detect the contact position based on the difference in the propagation time because the surface acoustic waves are acoustic waves and the velocity is relatively slow. Examples of such detection are illustrated as the eleventh through fifteenth embodiments below.

Eleventh Embodiment

Figure 25:
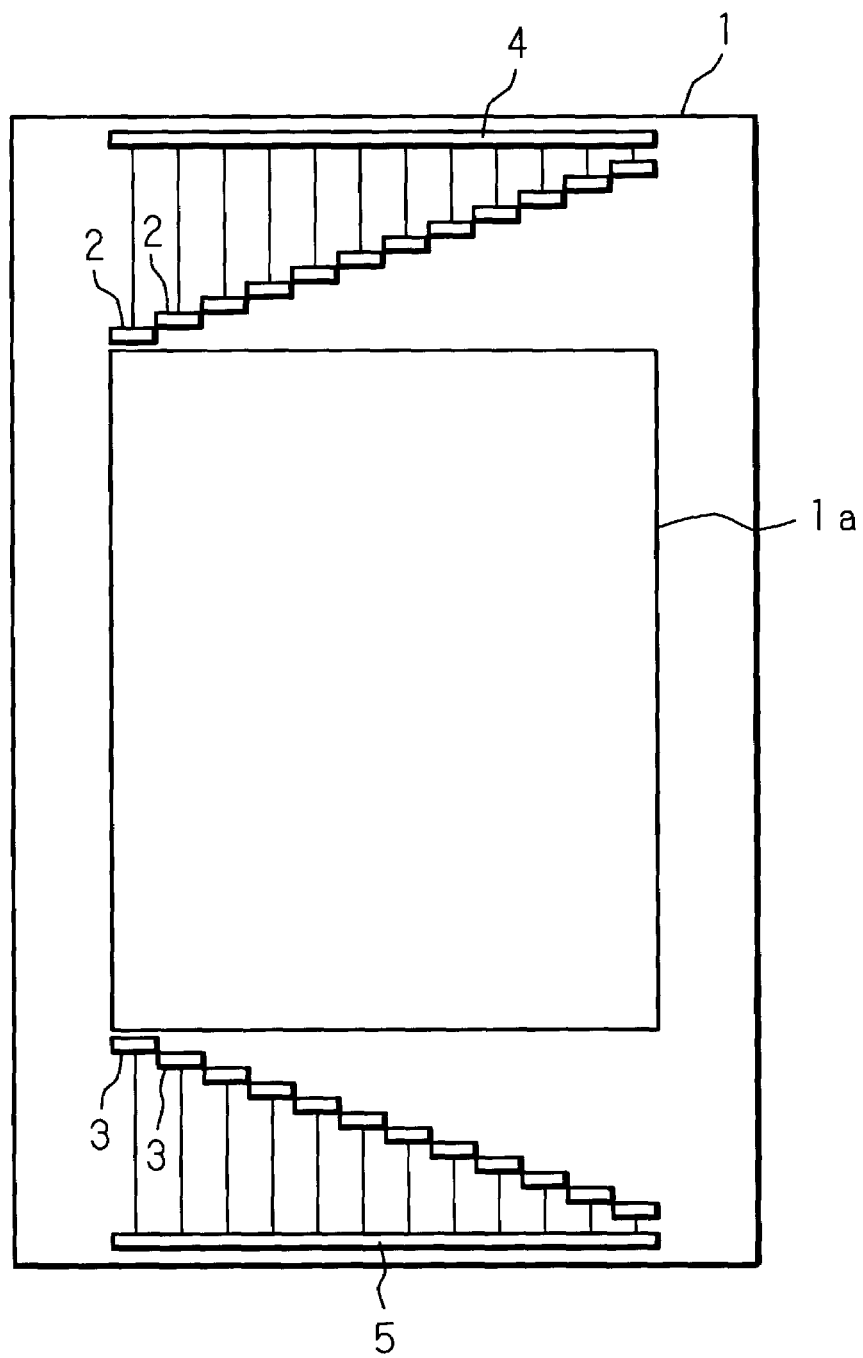
FIG. 25 is a view showing an example of the arrangement of the excitation elements and receiving elements in the eleventh embodiment.

FIG. 25 is a view showing an example of the arrangement of the excitation elements 2 and receiving elements 3 of a touch panel device according to the eleventh embodiment. A plurality of excitation elements 2, each composed of an IDT and a piezoelectric thin film, are formed in a step-like pattern on one end of the substrate 1. Moreover, a plurality of receiving elements 3 are formed in a step-like pattern on the other end of the substrate 1 so that they face the excitation elements 2, respectively. Hence, the distance between the excitation element 2 and receiving element 3 facing each other differs each facing pair. In this example, the step-like difference between the excitation elements 2/receiving elements 3 next to each other is equal to the length of the IDT.

Figure 26:
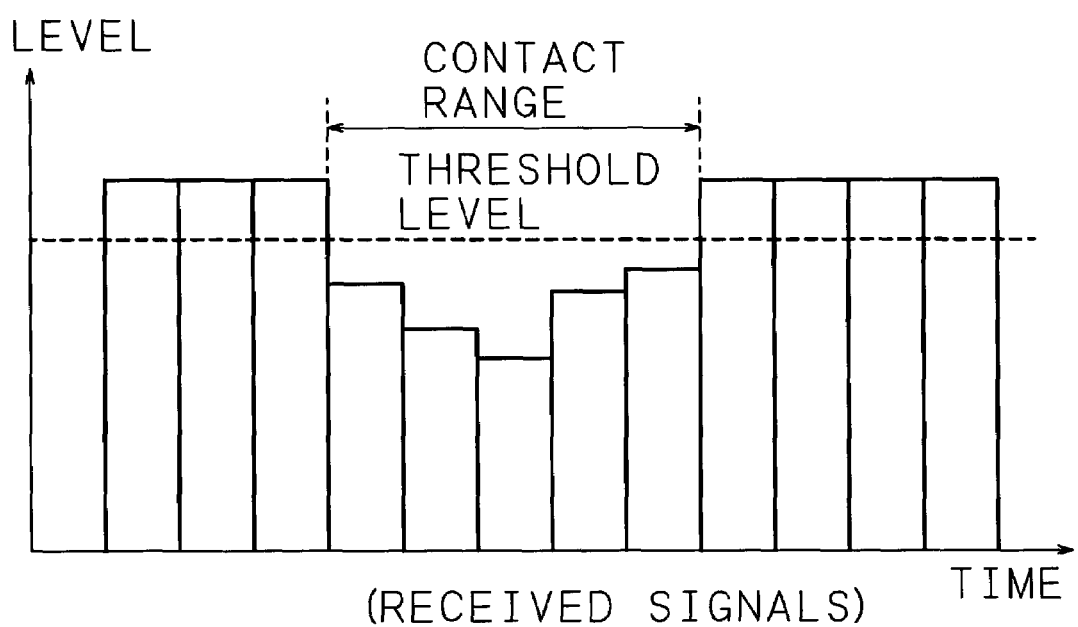
FIG. 26 is a view showing the time series of received signals in the eleventh embodiment.

Next, the following description will explain the operation. The excitation elements 2 are simultaneously excited with the same center frequency. The excited surface acoustic wave from each excitation element 2 is propagated across the substrate 1 and received by the facing receiving element 3. Here, since the distance between the excitation element 2 and receiving element 3 differs according to each pair, the receiving timings in the respective receiving elements differ from each other. Therefore, if the received signals are detected in a time series, they are detected as shown in FIG. 26, and their propagation paths can be distinguished from each other. Accordingly, since a propagation path where the received signal was attenuated can be specified, it is possible to detect the contact position of the finger or object in the same manner as in the above-described embodiments.

Twelfth Embodiment

Figure 27:
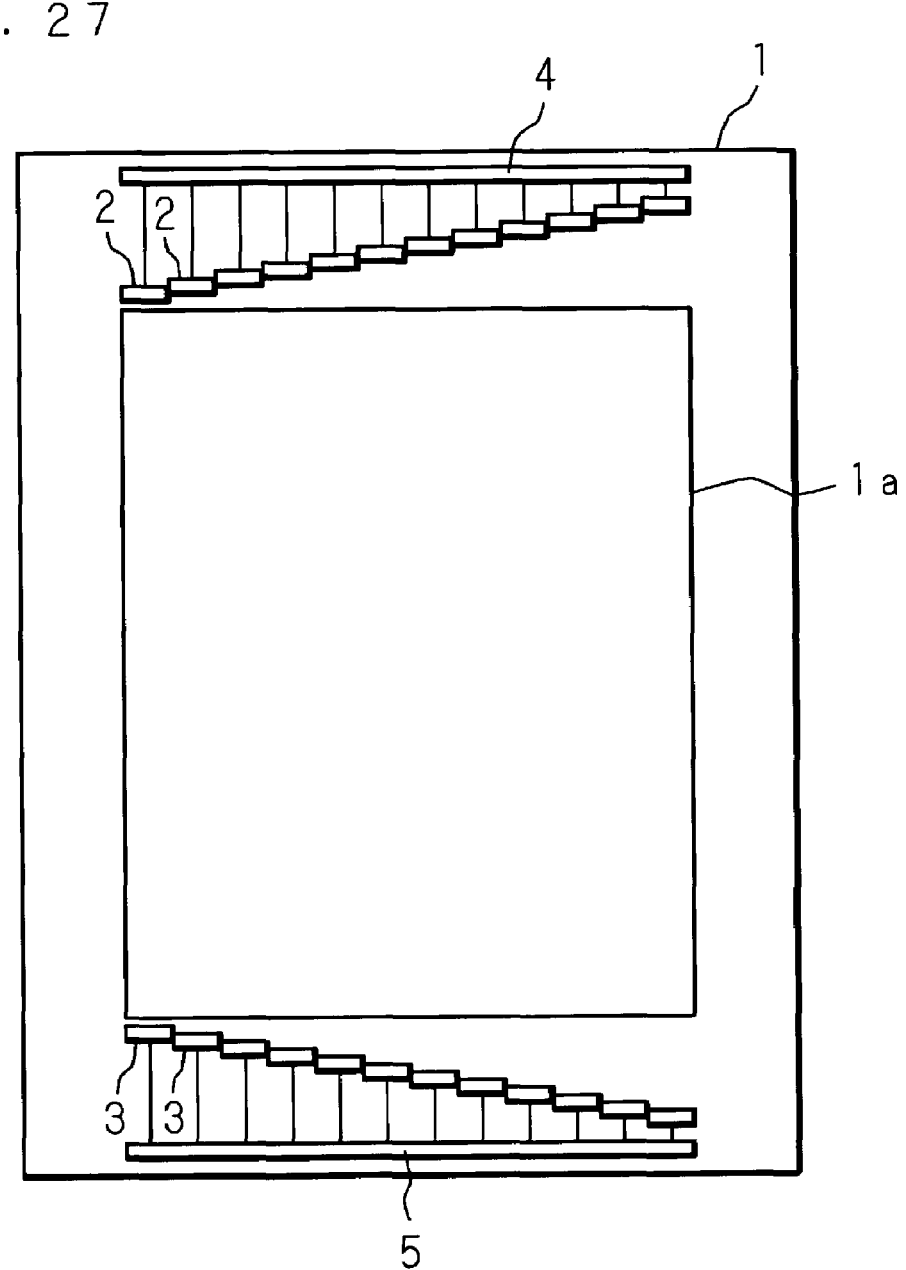
FIG. 27 is a view showing an example of the arrangement of the excitation elements and receiving elements in the twelfth embodiment.

FIG. 27 is a view showing an example of the arrangement of the excitation elements 2 and the receiving elements 3 of a touch panel device according to the twelfth embodiment. The step-like difference between the excitation elements 2/receiving elements 3 next to each other is equal to a half of the length of the IDT. Therefore, compared to the eleventh embodiment, the region where the excitation elements 2 and the receiving elements 3 are arranged is smaller, thereby enabling a reduction in the size of the structure. Note that the detection operation is performed in the same manner as in the eleventh embodiment.

Thirteenth Embodiment

Figure 28:
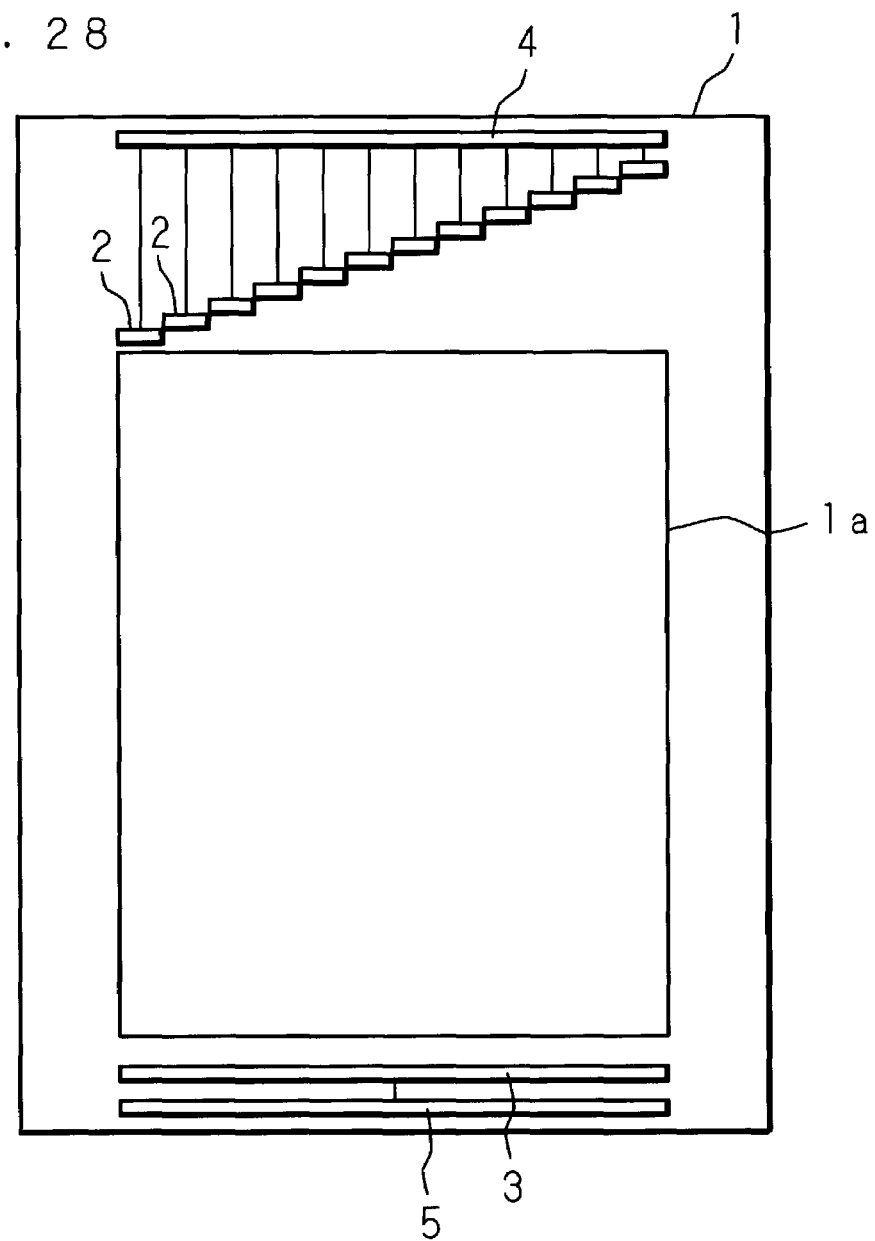
FIG. 28 is a view showing an example of the arrangement of the excitation elements and receiving element in the thirteenth embodiment.

FIG. 28 is a view showing an example of the arrangement of the excitation elements 2 and the receiving element 3 of a touch panel device according to the thirteenth embodiment. On one end of the substrate 1, a plurality of excitation elements 2 are arranged in a step-like pattern by successively shifting their positions by the length of an IDT. Moreover, on the other end of the substrate 1, a common receiving element 3 is formed. The distances from the respective excitation elements 2 to the receiving element 3 differ from each other. In this example, the surface acoustic waves are received by a single receiving element 3 having a common IDT with an aperture whose size is equal to the total length of the excitation elements 2. Note that the detection operation is performed in the same manner as in the eleventh embodiment.

Besides, in the thirteenth embodiment, it is also possible to arrange a plurality of receiving elements 3 in a step-like pattern and excite surface acoustic waves by a single excitation element 2 having a common IDT with a large aperture. In this case, it is possible to improve the beam characteristics of the surface acoustic waves.

Fourteenth Embodiment

Figure 29:
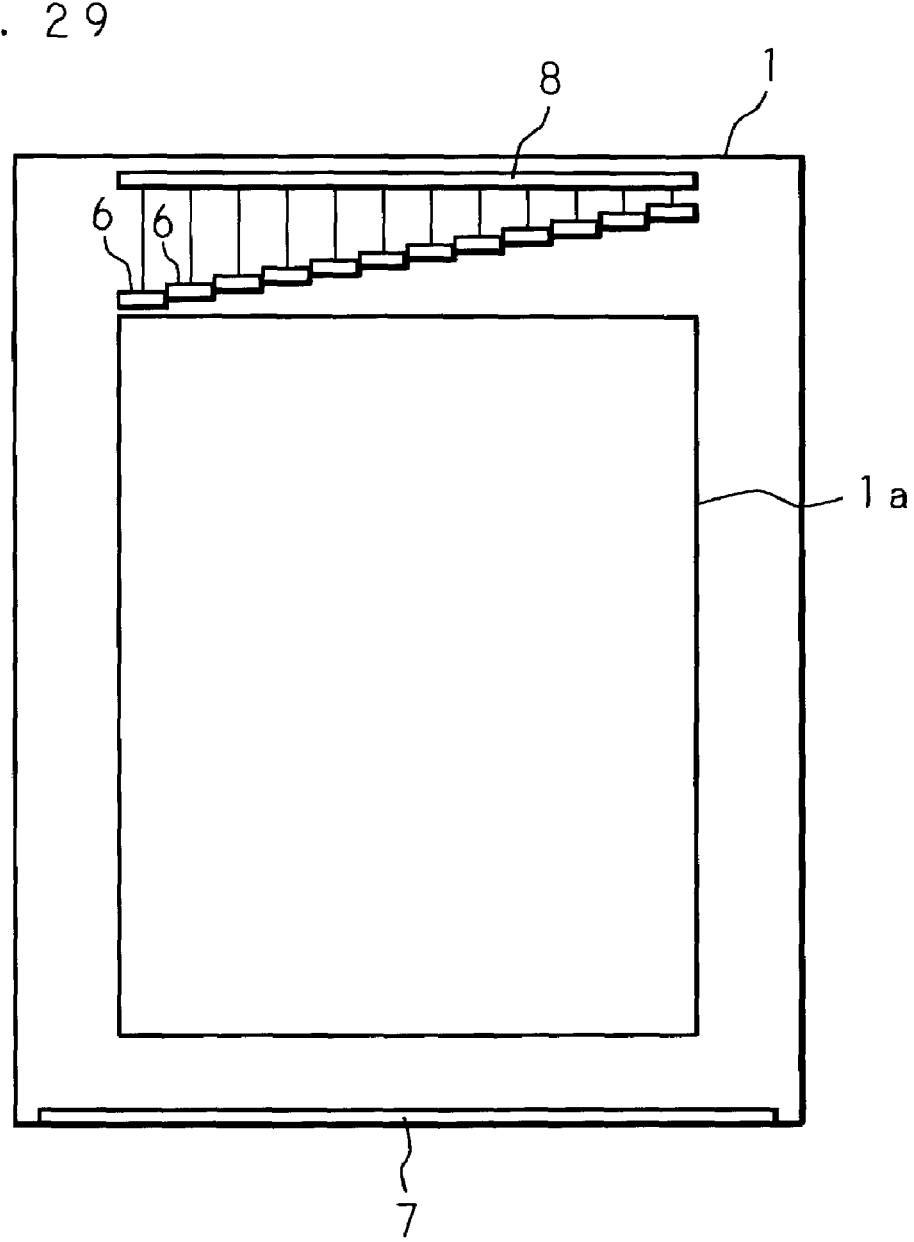
FIG. 29 is a view showing the basic structure of the fourteenth embodiment.

FIG. 29 is a view showing the structure of a touch panel device according to the fourteenth embodiment. On one end of the substrate 1, a plurality of excitation/receiving elements 6 for exciting and receiving surface acoustic waves are arranged in a step-like pattern by successively shifting their positions by the length of an IDT. Moreover, formed on the other end face of the substrate 1 is a reflecting member 7. The distances from the respective excitation/receiving elements 6 to the reflecting member 7 differ from each other. Further, the excitation/receiving elements 6 are connected to a common electrode 8 for excitation/receiving.

This example uses the reflection of a surface acoustic wave by the reflecting member 7 so as to enable a single excitation/receiving element 6 to excite and receive the surface acoustic wave. Since there is a propagation delay due to the to-and-fro movement of the surface acoustic wave on the substrate 1, it is possible to easily switch the driving systems for the excitation process and receiving process. Moreover, in order to avoid the influence of noise, a time gate corresponding to the delay time is applied.

Fifteenth Embodiment

In a touch panel device constructed to detect the contact position based on the difference in the propagation time of surface acoustic waves, in order to increase the difference in the propagation time for a higher detection accuracy, it is preferable to arrange the excitation elements 2 and the receiving elements 3 to propagate the surface acoustic waves in orthogonal directions of the substrate 1. In such a case, the installation density of the excitation elements 2 and receiving elements 3 can be increased, thereby improving the detection performance. FIG. 30 through FIG. 33 are views showing examples of the arrangement of the excitation elements 2 and receiving elements 3 of a touch panel device according to the fifteenth embodiment. In any of these examples, the propagation paths of surface acoustic waves are formed to incline at 45° with respect to a side direction of the substrate 1, thereby enabling two-dimensional contact position detection.

Figure 30:
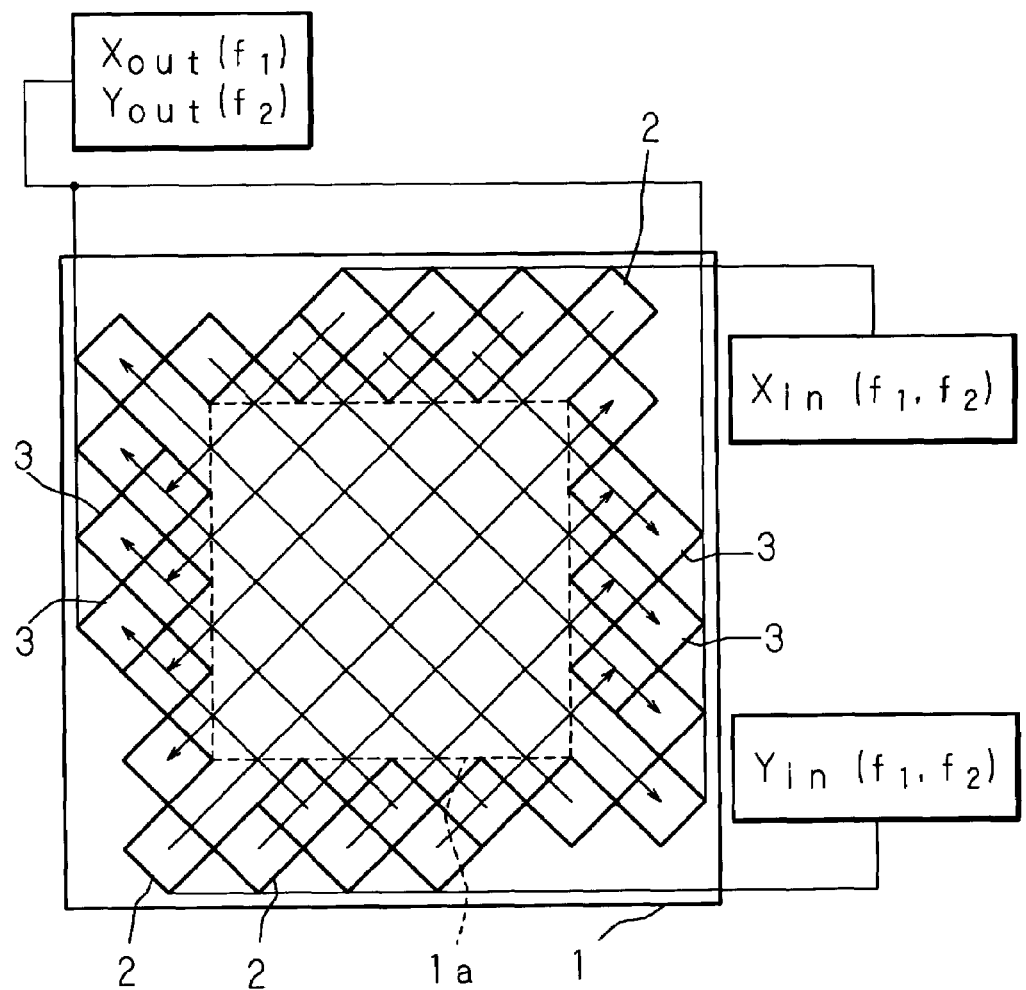
FIG. 30 is a view showing an example of the arrangement of the excitation elements and receiving elements in the first example of the fifteenth embodiment.
Figure 31:
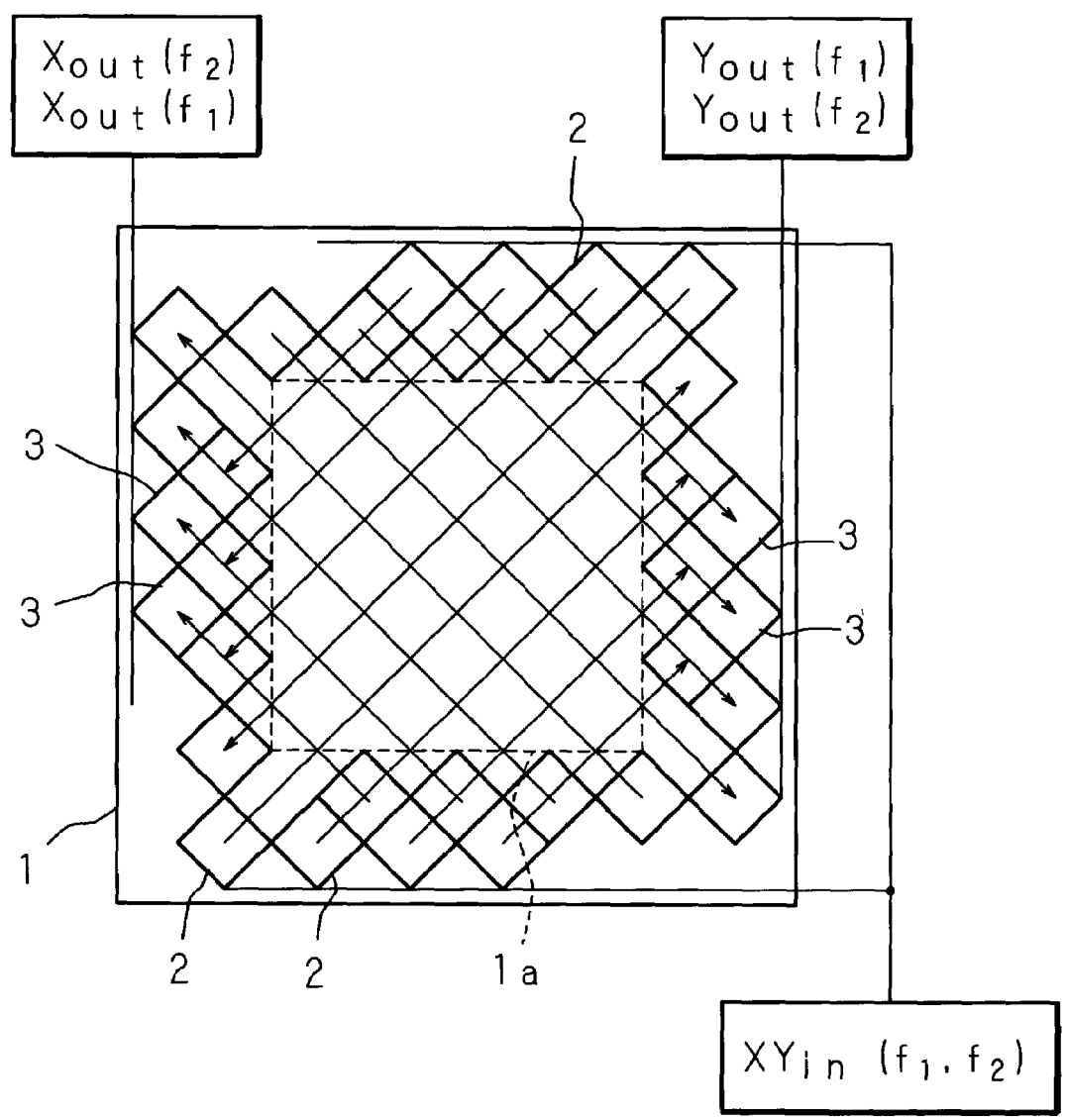
FIG. 31 is a view showing an example of the arrangement of the excitation elements and receiving elements in the second example of the fifteenth embodiment.
Figure 32:
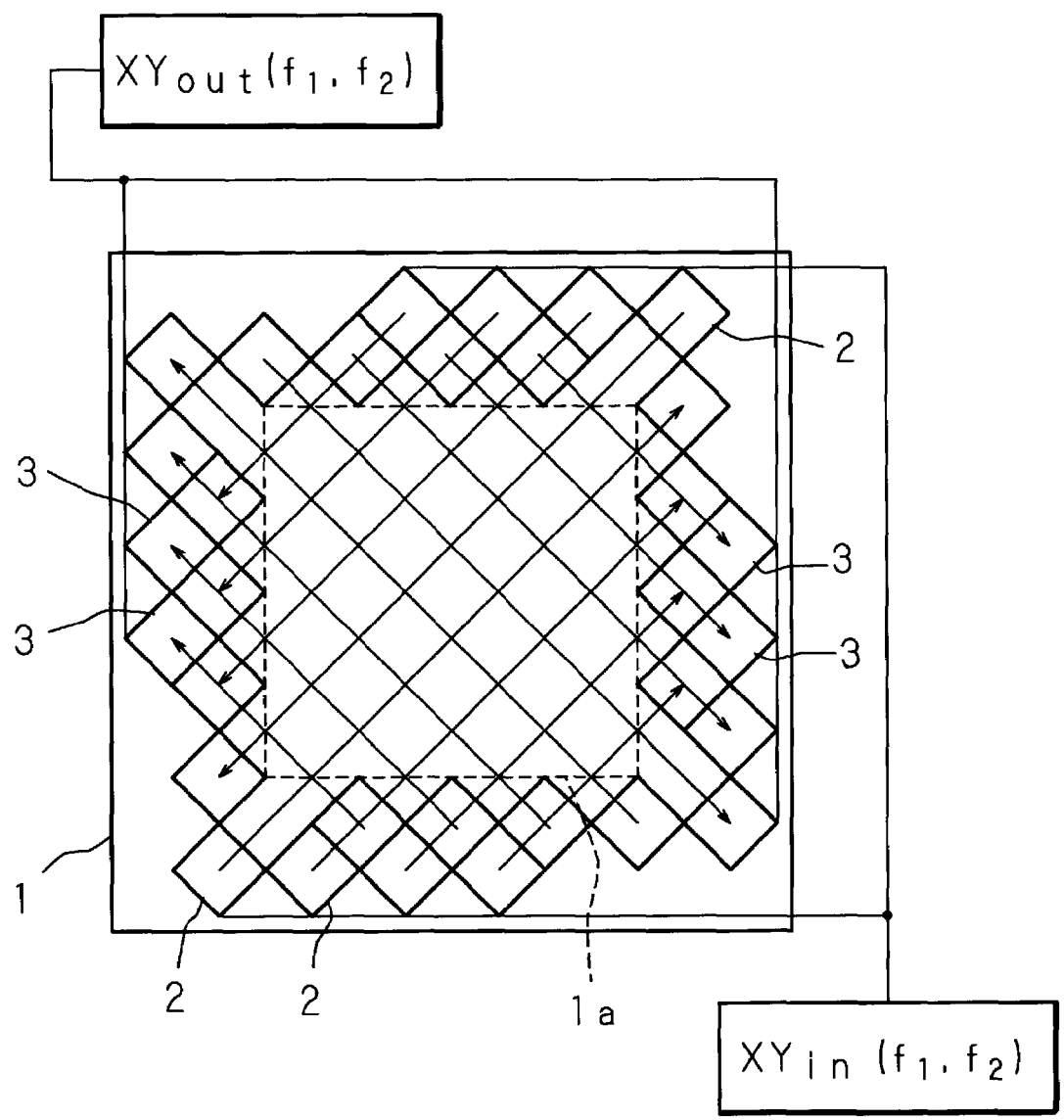
FIG. 32 is a view showing an example of the arrangement of the excitation elements and receiving elements in the third example of the fifteenth embodiment.
Figure 33:
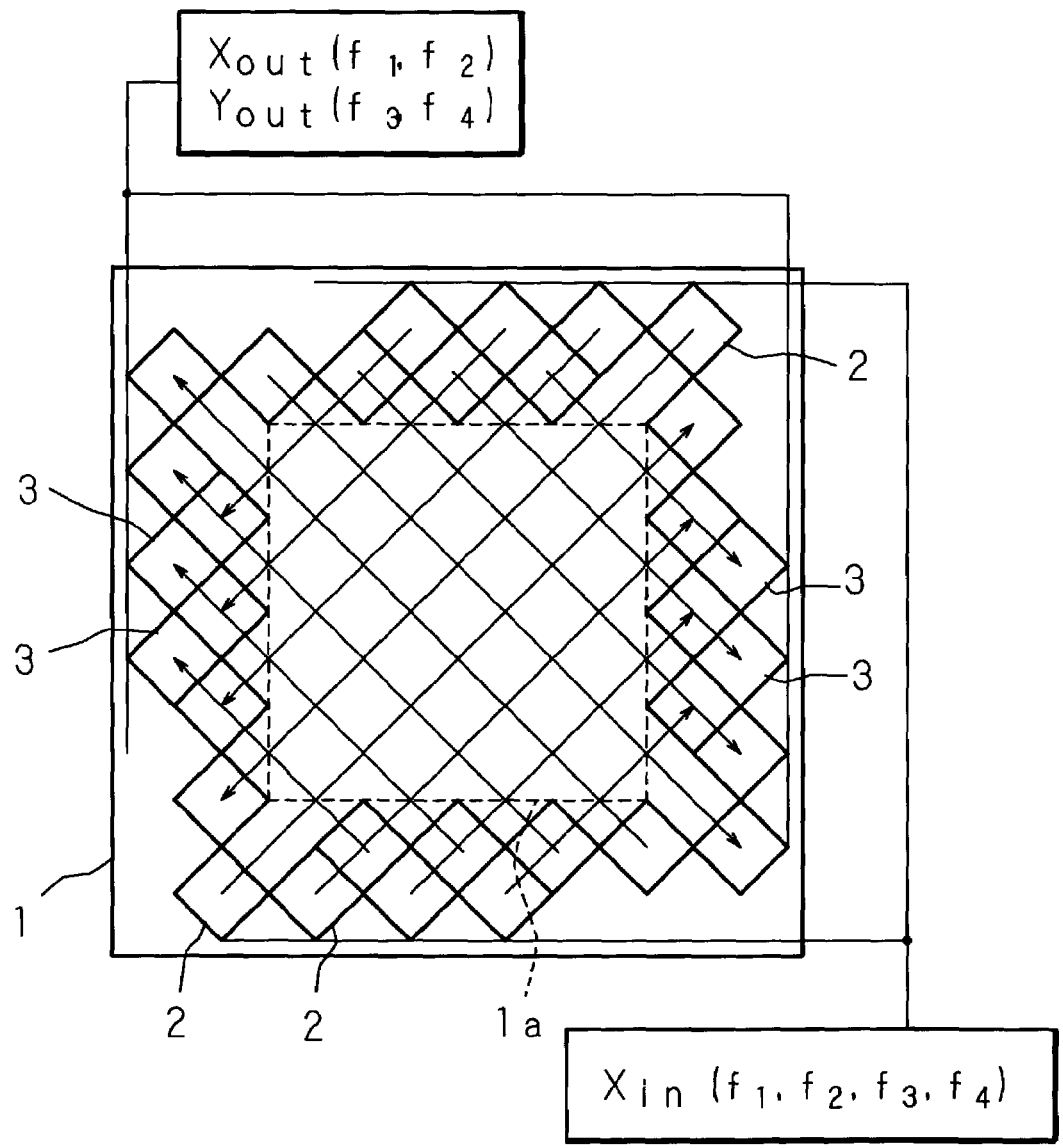
FIG. 33 is a view showing an example of the arrangement of the excitation elements and receiving elements in the fourth example of the fifteenth embodiment.

The first example of FIG. 30 separates the inputs, and adds the outputs. The second example of FIG. 31 uses the same input, and separates the outputs. The third example of FIG. 32 adds the inputs, and adds the outputs. The fourth example of FIG. 33 adds the inputs and adds the outputs by using IDTs having different center frequencies. Since some outputs have an equal propagation path length in the X direction and the Y direction and have the same propagation time, the center frequencies thereof are changed, so that the propagation paths are easily separated and specified.

INDUSTRIAL APPLICABILITY

As described above, according to a touch panel device of the present invention, even when the touch panel device is constructed in a small size, it is possible to detect the contact of a finger or an object with high accuracy and detect the precise one-dimensional or two-dimensional contact position.

The invention claimed is:
1. A touch panel device comprising:
a non-piezoelectric substrate;
a plurality of excitation elements, each including an IDT and a piezoelectric film, disposed on said non-piezoelectric substrate, for exciting, respectively, surface acoustic waves, each surface acoustic wave having a unique center frequency; and
a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency,
said touch panel device being characterized by propagating surface acoustic waves across said non-piezoelec- tric substrate, between the facing excitation elements and receiving elements, and detecting a position of an object in contact with said non-piezoelectric substrate, based on received results in said receiving elements, wherein the center frequencies of the IDTs of the excitation element and receiving element facing each other are substantially equal, and the center frequencies of the IDTs of the excitation elements and the receiving elements next to each other are different.

2. A touch panel device comprising:

a non-piezoelectric substrate;

a plurality of excitation elements, each including an IDT and a piezoelectric film, disposed on said non-piezoelectric substrate, for exciting, respectively, surface acoustic waves, each surface acoustic wave having a unique center frequency; and a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency, said touch panel device being characterized by propagating surface acoustic waves across said non-piezoelectric substrate, between the facing excitation elements and receiving elements, and detecting a position of an object in contact with said non-piezoelectric substrate, based on received results in said receiving elements, wherein the center frequencies of the IDTs of the excitation element and receiving element facing each other are substantially equal, the center frequencies of the IDTs of the excitation elements and the receiving elements next to each other are different, and, before a surface acoustic wave excited by one excitation element is received by the facing receiving element, the excitation element next to said one excitation element excites a surface acoustic wave.

3. A touch panel device comprising:

a non-piezoelectric substrate;

a plurality of excitation elements, each including an IDT and a piezoelectric film, disposed on said non-piezoelectric substrate, for exciting, respectively, surface acoustic waves, each surface acoustic wave having a unique center frequency; and a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency, said touch panel device being characterized by propagating surface acoustic waves across said non-piezoelectric substrate, between the facing excitation elements and receiving elements, and detecting a position of an object in contact with said non-piezoelectric substrate, based on received results in said receiving elements, wherein the center frequency of the IDT of each of said receiving elements is shifted from the center frequency of the IDT of the facing excitation element by a predetermined amount equal to or less than a bandwidth.

4. A touch panel device comprising:

a non-piezoelectric substrate; and two sets of excitation element/receiving element units including: a plurality of excitation elements, each including an IDT and a piezoelectric film, disposed on said non-piezoelectric substrate for exciting, respectively, surface acoustic waves, each surface acoustic wave having a unique center frequency; and a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency, said touch panel device being characterized by propagating surface acoustic waves across said non-piezoelectric substrate, between the facing excitation elements and receiving elements of each of said sets of excitation element/receiving element units, and detecting a two-dimensional position of an object in contact with said non-piezoelectric substrate, based on received results in said receiving elements, wherein, in each of said sets of excitation element/receiving element units, the center frequencies of the IDTs of the facing excitation element and receiving element are substantially equal, and the center frequencies of the IDTs of the excitation elements and the receiving elements next to each other are different.

5. A touch panel device comprising:

a non-piezoelectric substrate;

a plurality of excitation elements, each including an IDT and a piezoelectric film, disposed on said non-piezoelectric substrate, for exciting, respectively, surface acoustic waves, each surface acoustic wave having a unique center frequency; and a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency, said touch panel device being characterized by propagating surface acoustic waves across said non-piezoelectric substrate, between the facing excitation elements and receiving elements, and detecting a position of an object in contact with said non-piezoelectric substrate and pressure exerted by said object, based on amounts of attenuation of the surface acoustic waves of received results in said receiving elements.

6. A touch panel device comprising:

a non-piezoelectric substrate;

a plurality of excitation elements, each including an IDT and a piezoelectric film, disposed on said non-piezoelectric substrate, for exciting, respectively, surface acoustic waves, each surface acoustic wave having a unique center frequency; and a plurality of receiving elements, each including an IDT and a piezoelectric film, disposed on said non-piezoelectric substrate to face said excitation elements respectively, for receiving, respectively, surface acoustic waves, each surface acoustic wave having a unique center frequency, said touch panel device being characterized by propagating surface acoustic waves across said non-piezoelectric substrate, between the facing excitation elements and receiving elements, and detecting a position of an object in contact with said non-piezoelectric substrate, based on received results in said receiving elements, wherein a distance between the facing excitation element and receiving element differs according to each pair thereof.

* * * * *